US009177721B2

(12) United States Patent
Amatucci et al.

(10) Patent No.: US 9,177,721 B2
(45) Date of Patent: Nov. 3, 2015

(54) ELECTROCHEMICAL DEVICES AND METHODS OF FABRICATION

(71) Applicant: RUTGERS, THE STATE UNIVERSITY OF NEW JERSEY, Newark, NJ (US)

(72) Inventors: Glenn G. Amatucci, Peapack, NJ (US); Irene Plitz, Toms River, NJ (US); Anna B. Halajko, Parlin, NJ (US); Linda Wu Sung, Millburn, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 13/826,343

(22) Filed: Mar. 14, 2013

(65) Prior Publication Data

US 2014/0087214 A1    Mar. 27, 2014

Related U.S. Application Data

(60) Provisional application No. 61/610,850, filed on Mar. 14, 2012.

(51) Int. Cl.
| H01M 2/08 | (2006.01) |
| H01G 2/10 | (2006.01) |
| H01G 9/145 | (2006.01) |
| H01M 2/02 | (2006.01) |
| H01G 11/62 | (2013.01) |
| H01G 11/68 | (2013.01) |
| H01M 10/0525 | (2010.01) |
| H01M 10/058 | (2010.01) |
| H01G 11/80 | (2013.01) |

(52) U.S. Cl.
CPC ............... *H01G 2/103* (2013.01); *H01G 9/145* (2013.01); *H01G 11/62* (2013.01); *H01G 11/68* (2013.01); *H01M 2/026* (2013.01); *H01M 2/0262* (2013.01); *H01M 2/0287* (2013.01); *H01M 10/058* (2013.01); *H01M 10/0525* (2013.01); *H01G 11/80* (2013.01); *Y02E 60/13* (2013.01)

(58) Field of Classification Search
None
See application file for complete search history.

(56) References Cited

U.S. PATENT DOCUMENTS

| 7,794,511 B2 | 9/2010 | Wensley et al. |
| 7,994,372 B2 | 8/2011 | Kumar et al. |
| 2003/0152829 A1* | 8/2003 | Zhang et al. .................. 429/153 |

(Continued)

FOREIGN PATENT DOCUMENTS

WO    2011150093    12/2011

OTHER PUBLICATIONS

Scherson, D.A. et al "Batteries and Electrochemical Capacitors," The Electrochemical Society Interface, Spring 2006, pp. 17-22.

(Continued)

*Primary Examiner* — Patrick Ryan
*Assistant Examiner* — Wyatt McConnell
(74) *Attorney, Agent, or Firm* — Greenberg Traurig, LLP

(57) ABSTRACT

The described invention provides a packaged electrochemical device comprising an electrochemical battery, further comprising at least one electrochemical cell stack and a barrier packaging material. The present invention further provides a method of fabricating the packaged electrochemical device. The present invention further provides a flexible multifunctional liquid-based thermogalvanic cell that converts and stores electricity derived from low grade temperature differentials that exist in ubiquitous scenarios.

46 Claims, 6 Drawing Sheets

(56) References Cited

U.S. PATENT DOCUMENTS

| | | | |
|---|---|---|---|
| 2005/0170228 A1* | 8/2005 | Tajiri et al. | 429/30 |
| 2006/0154141 A1* | 7/2006 | Salot et al. | 429/149 |
| 2007/0026318 A1* | 2/2007 | Kishi et al. | 429/341 |
| 2008/0209876 A1* | 9/2008 | Miller | 55/522 |
| 2009/0311587 A1* | 12/2009 | Best et al. | 429/127 |
| 2010/0081057 A1* | 4/2010 | Liu et al. | 429/231.5 |
| 2011/0045349 A1* | 2/2011 | Pushparaj et al. | 429/212 |
| 2012/0121973 A1* | 5/2012 | Seo et al. | 429/199 |
| 2013/0026978 A1* | 1/2013 | Cooley et al. | 320/107 |
| 2013/0092866 A1* | 4/2013 | Rupert et al. | 252/62.2 |

OTHER PUBLICATIONS

Abruna, H. D. et al., "Batteries and electrochemical capacitors," Physics Today, Dec. 2008, pp. 43-47.

A. Lewandowski and A. Swiderska-Mocek, "Ionic liquids as electrolytes for Li-ion batteries—An overview of electrochemical studies", J. Power Sources, 194, 601-609 (2009).

V. Baranchugov et al., "Amorphous silicon thin films as high capacity anodes for Li-ion bathes in ionic liquid electrolytes", Electrochem. Comm., 9, 796-800 (2007).

H. Sakaebe, et al., "N-Methyl-N-propylpiperidinium bis(trifluoromethanesulfonyl)imide (PP13-TFSI)—novel electrolyte base for Li battery", Electrochem. Comm., 5, 594-598 (2003).

H. Matsumoto, et al., "Fast cycling of Li/LiCoO2 cell with low viscosity ionic liquids based on bis(fluorosulfonyl) imide [FSI]-", J. Power Sources, 160, 1308-1313 (2006).

H. Sakaebe, et al., "Application of room temperature ionic liquids to Li batteries", Electrochimica Acta, 53, 1048-1054 (2007).

Y. Nuli, et al., "Electrochical Magnesium Deposition and Dissolution with High Efficiency in Ionic Liquid", Electroch. And Solid State letters, 8, C166-C169, (2005).

G. Wang, et al., "A review of Electrode Materials for Electrochemical Supercapacitors", Chem. Soc. Rev. 797-828 (2012).

B. Ellis, et al., "Positive Electrode Materials for Li-ion and Li-Batteries", Chem. Mater., 22, 691-714, (2010).

W. Zhang, "A review of the Electrochemical performance of alloy anodes for lithium batteries", J. Power Sources, 196, 13-24 (2011).

J.-M. Tarascon et al., "Issues and challenges faciong rechargeable lithium batteries", Nature, 414, 359 (2001).

G. G. Amatucci and N. Pereira, "Fluoride based electrode materials for afvanced energy storage devices", J. Fluorine Chemistry, 128, 243-262 (2007).

J.-M. Tarascon et al., "Performance of Bellcore's Plastic Rechargeable Li-ion Battery", Solid State Ionics, 86-88, 49-54 (1996).

A. Dupasquier et al., "Plastic PVDF-HFP electrolyte laminates prepared by a phase inversion process" Solid State Ionics, 135, 249-257 (2000).

A. Dupasquier et al., "Microstructure effects in plasticized electrodes based on PVDF-HFP for plastic Li-ion Batteries", J. Power Sorces, 97-98, 758-761, (2001).

H. Manjunatha, et al., "Electrode materials for aqueous rechargeable batteries", J. Solid State Electrochem., 431-445 (2011).

J. Luo and Y. Xia, "Aqueous lithium ion battery LiTi2(PO4)3/LiMn2O4 with high power and energy densities as well as superior cycling stability", Adv. Funct. Mater., 17, 3877-3884 (2007).

W. Li, et al., "Rechargeable Lithium Batteries with Aqueous Electrolytes", Science, 264, 1115 (1994).

T. Abraham et al., "Seebeck Coefficients in Ionic Liquids-Prospects for Thermo-electrochemical Cells", Chem. Commun., 47, 6260-6262, (2011).

N. Hudak and G.G. Amatucci, "Small Scale Energy Harvesting Through Thermoelectric, Vibration, and Radiofrequency Power Conversion" (Invited Review), J. Applied Phys., 103, 101301 (2008).

T. I. Quickenden and Y. Mua, "A Review of Power Generation in Aqueous Thermogalvanic Cells" J. Electrochem. Soc., 142, 3985 (1995).

N. Hudak and G.G. Amatucci, "Energy Harvesting and Storage with Lithium-Ion Thermogalvanic Cells", J. Electrochem. Soc. 158, A572-A579 (2011).

S. Liu, "Reachargeable Aqueous Lithium Ion-Battery of TiO2/LiMn2O4 with a high voltage", J. Electrochem. Soc., 158, A1490-A1497(2011).

Y. V. Kuzminskii, et al., "Thermoelectric Effects in Electrochemical Systems. Nonconventional Thermogalvanic Cells" J. Power Sources, 52, 231 (1994).

Meng, E et al., "Plasma removal of parylene C." J. Micromech. Microeng. 18: 1-13 (2008).

Jayaprakash, N. et al. "The rechargeable aluminum-ion battery." Chem. Commun., 2011, 47, 12610-12612.

* cited by examiner

ELECTROCHEMICAL DEVICES AND METHODS OF FABRICATION

CROSS-REFERENCE TO RELATED APPLICATIONS

This application claims priority from U.S. provisional patent application Ser. No. 61/610,850, filed Mar. 14, 2012, the entire disclosure of which is incorporated herein by reference.

STATEMENT OF GOVERNMENT FUNDING

This invention was made with U.S. government support. The government has certain rights in the invention.

FIELD OF THE INVENTION

The described invention relates to electrochemical energy storage devices, particularly to electrochemical cells and methods of fabricating such cells with conformal barrier coatings.

BACKGROUND OF THE INVENTION

Electrochemical Cells

Electrochemical cells are electrochemical energy storage (EES) devices or device components that convert stored chemical energy into electrical energy. They rely on electrochemical reactions, specifically oxidation-reduction (redox) reactions, to generate electrical energy. The redox reactions can be either spontaneous, as for example in galvanic (or voltaic) cells, or non-spontaneous, as for example in electrolytic cells. A typical electrochemical cell includes two electrodes: an anode, electron source, where oxidation occurs, and a cathode, electron sink, where reduction occurs. Galvanic cells are usually used in batteries, electrochemical capacitor cells and thermogalvanic cells.

Battery Cells

Typically, battery cells consist of single or multiple galvanic cells, connected in series to generate high voltages. Some batteries can be used only once (also called non-rechargeable or primary batteries) and some can be used multiple times (called rechargeable or secondary batteries). Common examples of a primary battery include, but are not limited to, a Zinc-Manganese dioxide ($Zn|MnO_2$) battery and of a secondary battery include, but are not limited to, nickel metal hydride ($Ni|MH$), nickel-cadmium and lithion-ion batteries. (Reviewed in Scherson, D. A. et al., "Batteries and Electrochemical Capacitors," The Electrochemical Society Inerface, Spring 2006, pp 17-22; and Abruna, H. D. et al., "Batteries and electrochemical capacitors," Physics Today, December 2008, pp. 43-47).

Batteries generally include an electrolyte and a porous separator that allows ions to be transported between the electrodes but not electrons to be conducted between them. Battery cells store energy in the form of chemical reactants, and can store large amounts of energy per unit mass because of electrochemical reactions that involve transfer of charge across interfaces between the battery's electrodes and the surrounding electrolyte solution, and that lead to the redox reaction and generation of charged species at the interfaces. The porous separators are usually made of electronically insulating polymeric materials separate the oxidation and reduction chambers to prevent short circuits.

Electrochemical Capacitor Cells

Like a conventional capacitor, an electrochemical capacitor stores energy as charge on a pair of electrodes. The behavior of an electrode-electrolyte interface resembles that of a conventional capacitor in that charge transfer across the interface over a limited voltage range may be impaired. Unlike a conventional capacitor, an electrochemical capacitor stores charge in an electric double layer that forms at the interface between an electrode and an electrolyte solution. Because of the intrinsically fast mechanism for storing and releasing energy, electrochemical capacitors are suited for applications that require high power. For example, electrochemical capacitors can be used to store energy that is normally wasted as heat during repetitive motions, such as deceleration of automobiles during braking, in cranes, forklifts and elevators. The charge that can be stored in an electrochemical capacitor is proportional to the surface area of the electrodes. Typical electrochemical capacitors used include, but are not limited to, electrochemical capacitors containing high surface area carbons, such as activated carbons consisting of significant volume of mesoporosity, carbon nanotubes, and structures of graphene.

Ultracapacitors are electrochemical capacitors that have the ability to store unusually large amounts of charge, for example hundreds of farads (F) of charge, as compared to few tens of millifarads (mF) stored by electrolytic capacitors of similar dimensions. For example, an ultracapacitor composed of activated carbon has a capacitance of 100-140 F/g.

Exemplary ultracapacitors include, but are not limited to, electric double-layer capacitors (EDLCs), pseudocapacitors, supercapacitors, asymmetric hybrid capacitors, and the like. An electric double-layer capacitor (EDLC) derives its capacitance from an electric double layer alone. A pseudocapacitor utilizes electrochemical reactions like battery cells, but still behaves as a capacitor in its charge storage properties. The fast and reversible electrochemical redox reactions at the electrode surfaces combined with electric double layer storage of charge allow pseudocapacitors to store more energy (at least one order of magnitude) more than EDLCs. For example, pseudocapacitor electrodes made of Ruthenium dioxide ($RuO_2$) provide a capacitance above 1000 F/g. Alternative pseudocapacitors are polymer-based, for example, organic redox compounds such as polythiophene. However, polymer-based pseudocapacitors have poor charge-discharge cyclability as compared to EDLCs, because the redox processes degrade the molecular structure of the electrode materials. Asymmetric hybrid capacitors combine a battery-type electrode that stores energy in the form of chemical reactants with a capacitor type electrode that stores energy directly as charge. The battery type electrode provides high energy output while the capacitor-type electrode provides high power. An example of such hybrid capacitor cells includes, without limitation, carbon-lithium titanate electrodes in a lithium electrolyte.

Thermogalvanic Cells

A thermogalvanic cell (also called a non-isothermal cell) is an electrochemical cell in which the two electrodes are at different temperatures giving rise to a temperature gradient, such that the thermogalvanic cell is capable of being charged under the temperature gradient and discharged when the gradient is removed. (J. N. Agar, in Advances in Electrochemistry and Electrochemical Engineering, P. Delahay, Editor, p. 31, Wiley, New York (1963)). Thermogalvanic cells generate electrical energy through the direct conversion of thermal energy. Traditional thermoelectric cells are semiconductor devices that utilize the material's intrinsic Seebeck coefficient to extract useful energy from thermal gradients. A principle figure of merit which describes their effectiveness is "ZT". As defined: $ZT=TS^2_e(\sigma/\kappa)$ (1), where T is the temperature, $\sigma/\kappa$ is the electrical to thermal conductivity ratio, and S is the Seebeck coefficient. Seebeck coefficient, S, is the thermopower of a material that represents the magnitude of an induced thermoelectric voltage in response to a temperature difference across that material and entropy per charge carrier in the material. (Rockwood, Alan L., "Relationship of thermoelectricity to electronic entropy". Phys. Rev. A 30 (5): 2843-4 (1984)).

In symmetric thermogalvanic cells (those with compositionally identical electrodes), the temperature gradient produces a proportional voltage output. The great majority of research in thermogalvanic cells has been based on redox couples dissolved in aqueous electrolytes with noble metal electrodes. (T. I. Quickenden and Y. Mua, "A Review of Power Generation in Aqueous Thermogalvanic Cells" J. Electrochem. Soc., 142, 3985 (1995)). Similar to thermoelectric devices, thermogalvanic cells produce continuous power output when supplied with constant heat flow. An alternative approach is to use energy storage materials at the electrodes, thus making the cell both an energy harvester and a battery. A cell with symmetric, single-phase intercalation electrodes can undergo a charge-discharge cycle when supplied with oscillating heat flow. For example, Kuzminskii et al. fabricated cells with symmetric $Li_xTiS_2$ electrodes and nonaqueous electrolyte. (Y. V. Kuzminskii, V. A. Zasukha, and G. Y. Kuzminskaya, "Thermoelectric Effects in Electrochemical Systems. Nonconventional Thermogalvanic Cells" J. Power Sources, 52, 231 (1994)). A complete demonstration of a thermogalvanic battery with storage electrodes has recently been demonstrated. (N. Hudak and G. G. Amatucci, "Energy Harvesting and Storage with Lithium-Ion Thermogalvanic Cells", J. Electrochem. Soc. 158, A572-A579 (2011)). Such storage-type thermogalvanic cells can be contrasted with a traditional non storage-type thermogalvanic cells, as described in T. I. Quickenden and Y. Mua, "A Review of Power Generation in Aqueous Thermogalvanic Cells" J. Electrochem. Soc., 142, 3985 (1995). Both storage-type thermogalvanic cells as well as non-storage-type thermogalvanic cells can use liquid electrolytes. Thermogalvanic devices known in the art are bulky devices limiting their practicability.

Barrier Packaging

Electrochemical cells require the use of rigid hermetically or near hermetically sealed containers that contain the electrolyte within the container while keeping the electrolyte free from influence of the exterior environment. However, such rigid containers have limitations as packaging materials that depend on various factors, such as form of the electrochemical cell used, (for example, as used in hand-held electronics), hardware and assembly costs, (for example, as used in electric and hybrid vehicles). Jansen, A. N. et al. described low-cost flexible battery packaging materials such as with multilayered laminates (Jansen, A. N. et al., Journal of the Minerals, Metals and Materials Society, 54(3): 29-32 (2002)). Such multilayered laminates, typically used in the manufacture of lithium ion batteries, have deleterious qualities such as excessive thickness >100 microns, non conformal characteristics, and the use of seals to bond multiple layers of packaging together. Such seals are usually thermally bonded, and can result in loss of valuable volume which cannot be utilized for energy storage.

Conformal Coating

A process, known as conformal coating, which involves covering a surface with a thin protective film that conforms to the surface without seals, is routinely used to protect surfaces from corrosion in harsh environments. The coating used is normally 0.001" to 0.008" (25 µm to 200 µm) in thickness. Exemplary conformal coating materials used include, but are not limited to, acrylics, polyurethanes, epoxies, silicones, paraxylylenes, fluorocarbons, etc. Conformal coatings are used for covering a wide variety of surfaces, such as vehicle bodies and electrical circuitry. Of these, paraxylylene conformal coatings are characterized by moisture, chemical and temperature resistance. The deposition of paraxylylene (Parylene) conformal coatings requires a process utilizing pressure of less than 10-2 torr. Because typical lithium ion battery non-aqueous electrolytes have much higher vapor pressures, the battery cannot maintain acceptable performance after exposure to vacuum atmosphere; as such the use of conformal coatings deposited at less than ambient pressure conditions are not feasible. The described invention provides a solution to the aforementioned problem and includes a class of electrolytes called ionic liquids, which have low intrinsic vapor pressures introduced into the cell before a conformal barrier coating comprising Parylene is deposited at low vapor pressures. As the electrolyte will not evaporate, the cell will be viable. The Parylene process utilizes a dimer that is transformed to a monomer in the vapor form at high temperatures and vacuum, which then polymerizes on the surface of the substrate.

SUMMARY OF THE INVENTION

According to one aspect, the described invention provides an electrochemical device comprising an electrochemical cell, wherein the electrochemical cell further comprises (i) an electrolyte comprising an ionic liquid; (ii) at least one electrochemical cell stack, comprising (1) a first layer containing a positive electrode; (2) a second layer containing a porous separator; (3) a third layer containing a negative electrode; and (iii) a barrier packaging material comprising at least one conformal barrier coating layer deposited at a pressure of less than 1 atm. According to one embodiment of the electrochemical device, the second layer containing the porous separator is bonded between the first layer containing the positive electrode and the third layer containing the negative electrode. According to another embodiment, the barrier packaging material is conformally deposited over each surface of each side of the electrochemical cell stack. According to another embodiment, the ionic liquid further comprises a dissolved salt. According to another embodiment, the electrolyte further comprises a cosolvent that has a vapor pressure <10-1 torr. According to another embodiment, the at least one electrochemical cell stack further comprises a positive current collector associated with the positive electrode. According to another embodiment, the at least one electrochemical cell stack further comprises a negative current collector associated with the negative electrode. According to another embodiment, the dissolved salt is a dissolved salt of lithium ion (Li+). According to another embodiment, the dissolved salt is a dissolved salt of at least one of magnesium ion ($Mg^{2+}$), zinc ion ($Zn^{2+}$), or lithium ion ($Li^+$). According to another embodiment, the ionic liquid further contains a piperidinium cation. According to another embodiment, the ionic liquid further contains a pyrrolidinium cation, or an imidazolium cation. According to another embodiment, the at least one electrochemical cell stack is a bonded microporous electrochemical cell stack that has the ability to store the ionic liquid within its pores. According to another embodiment, the electrochemical cell is a battery cell. According to another embodiment, the battery cell is a lithium ion battery cell. According to another embodiment, the positive electrode and the negative electrode comprises an electrode composition within the electrochemical stability of water. According to another embodiment, the battery cell is a fluoride battery cell. According to another embodiment, the electrochemical cell is a thermogalvanic cell. According to another embodiment, the electrochemical cell is an electrochemical capacitor cell. According to another embodiment, the electrochemical capacitor cell is a supercapacitor cell. According to another embodiment, the electrochemical capacitor cell is an ultracapacitor cell. According to another embodiment, the electrochemical capacitor cell is a pseudocapacitor cell According to another embodiment, the electrochemical capacitor cell is an asymmetric hybrid capacitor cell According to another embodiment, each conformal barrier coating layer is deposited onto the electrochemical battery at a pressure less than one atmospheric pressure. According to another embodiment, each conformal barrier coating layer contains at least one para-xylylene polymer variant. According to another embodiment, the at least one parylene (para-xylylene polymer) variant is parylene C (para-chloroxylylene polymer). According to another embodiment, each conformal barrier coating layer contains a barrier agent. According to another embodiment, the barrier agent is a hermetic agent. According to another embodiment, the barrier packaging material comprises alternating layers of a conformal barrier coating layer containing at least one para-xylylene polymer variant and a conformal barrier coating layer comprising a barrier agent. According to another embodiment, the hermetic agent is a metal or metal oxide. According to another embodiment, the metal is selected from the group consisting of aluminium, copper, bismuth, or a combination thereof. According to another embodiment, the barrier agent is a carbon barrier agent. According to another embodiment, the carbon barrier agent is graphene. According to another embodiment, the barrier agent is an inorganic barrier agent. According to another embodiment, the inorganic barrier agent is a metal oxide. According to another embodiment, the conformal barrier coating layer ranges from 1 micron to 100 microns in thickness. According to another embodiment, the conformal barrier coating layer ranges from 5 microns to 25 microns in thickness. According to another embodiment, each electrode is optionally associated with a current collector. According to another embodiment, the current collector is a metal current collector. According to another embodiment, the current collector is a carbon current collector. According to another embodiment, the carbon current collector comprises graphene. According to another embodiment, the carbon current collector comprises carbon nanotubes. According to another embodiment, each electrochemical cell stack comprises a plurality of electrochemical cells connected in parallel within the packaged electrochemical device. According to another embodiment, each electrochemical cell stack comprises a plurality of electrochemical cells connected in series within the packaged electrochemical device.

BRIEF DESCRIPTION OF THE DRAWINGS

FIG. 1A represents one cell stack, the basic component of the electrochemical cell, consisting of a positive electrode, a negative electrode, a separator, an electrolyte and a current collector for each electrode. FIG. 1B represents Step 2, where the cell stack is suspended inside a parylene vacuum deposition chamber where parylene is then deposited directly on the cell stack. FIG. 1C represents step 3, where the cell stack is introduced to a high or medium vacuum physical vapor deposition equipment to deposit a uniform conformal coating layer of a hermetic agent, such as an inorganic agent e.g. a metal. FIG. 1D represents step 4, where a top coat of Parylene is deposited.

DETAILED DESCRIPTION OF THE INVENTION

Glossary

Figure 1:
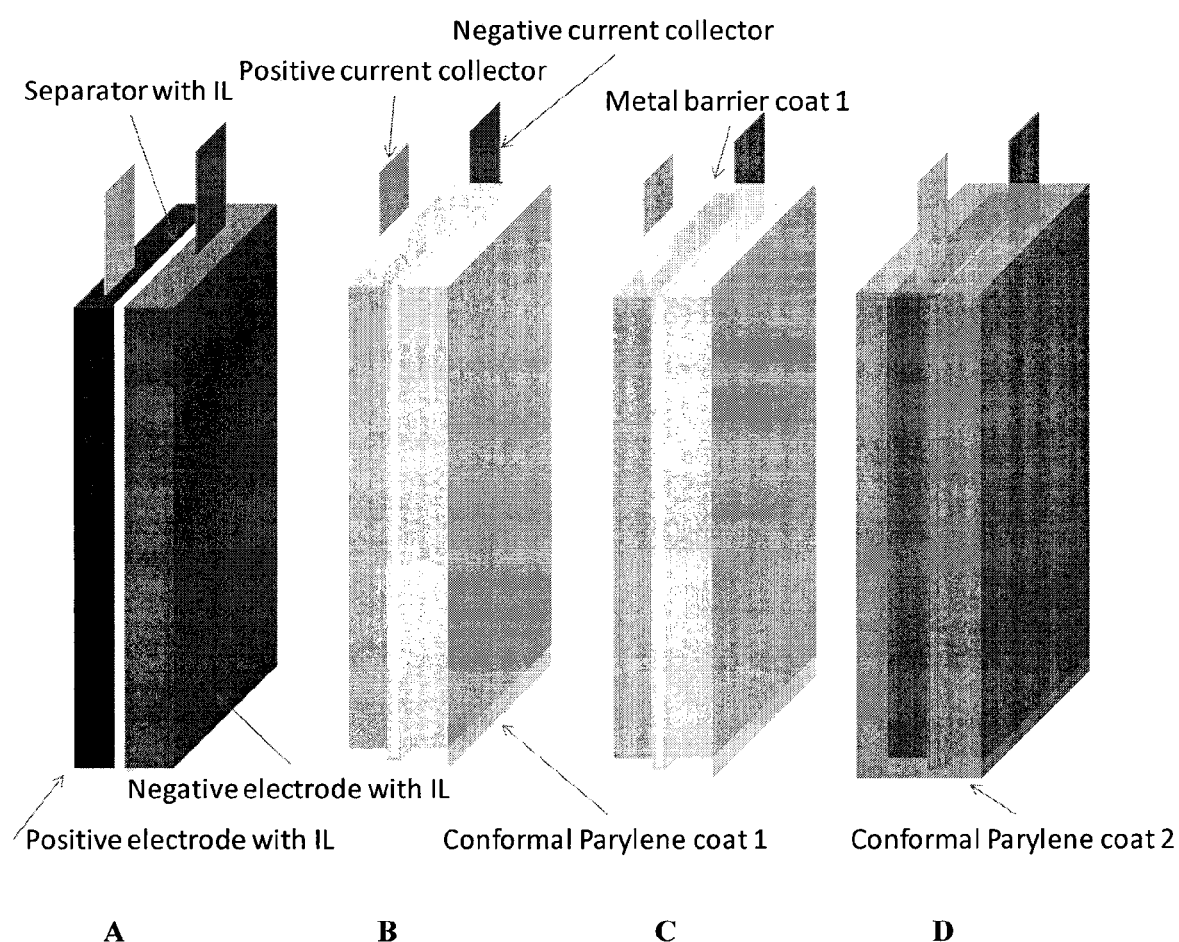
FIG. 1 shows a partial cell fabrication sequence according to the method described in Example 1.
Figure 2:
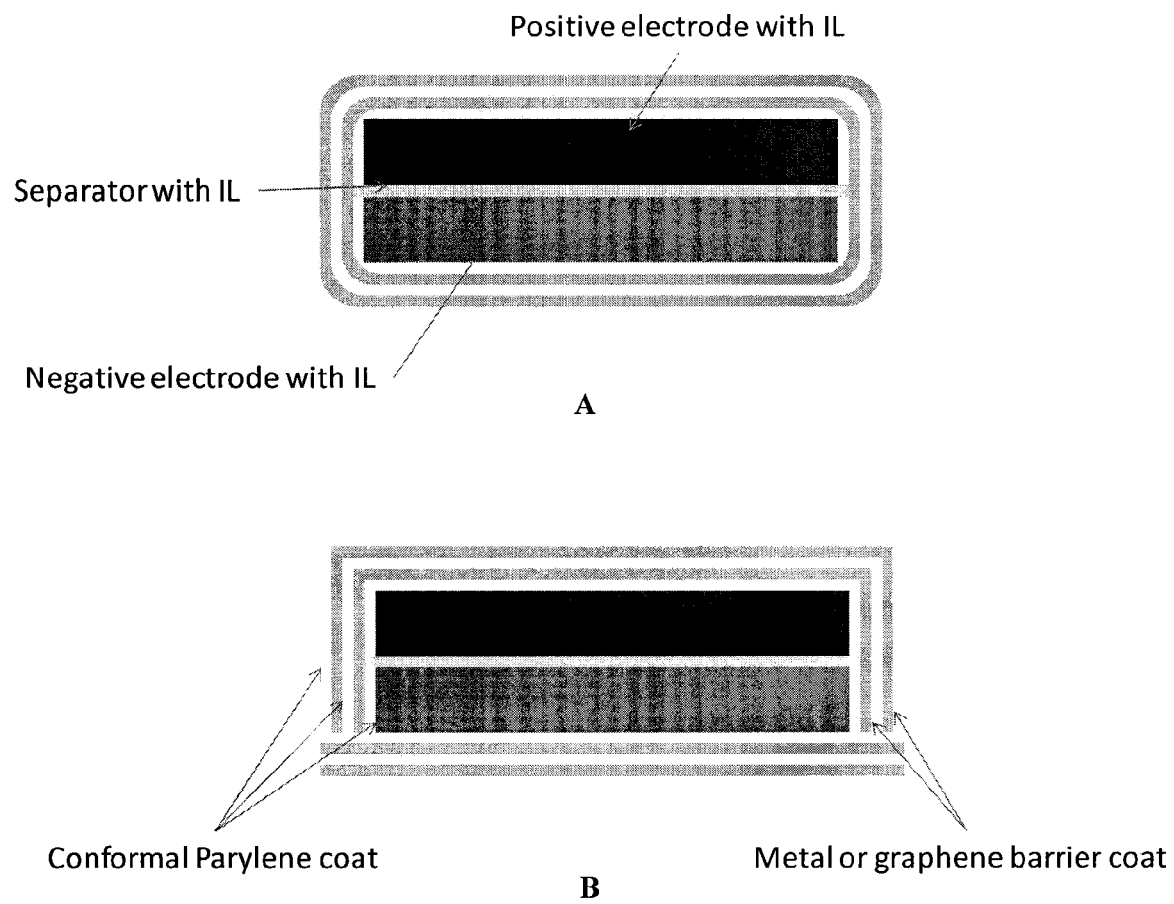
FIG. 2 shows cross-sections of an electrochemical cell according to Example 1 (A) and Example 2 (B).

The term "barrier", as used herein, refers to a means to prevent reaction of an electrochemical cell, contained within a packaged electrochemical device, with the ambient atmosphere.

The term "barrier agent", as used herein, refers to a substance that prevents reaction of an electrochemical cell, contained within a packaged electrochemical device, with the ambient atmosphere.

The term "barrier packaging material", as used herein, refers to a material which prevents reaction of an electrochemical cell, contained within a packaged electrochemical device, with the ambient atmosphere.

The term "capacitor", as used herein, refers to a device that has the ability to store electric charge between conductors that are separated by a dielectric material where a potential difference exists between the conductors (capacitance).

The term "conformal", as used herein, refers to, without limitation, having the same operable shape with consistent dimensions.

The term "conformal barrier coating", as used herein, refers to a touching and/or bonding of one layer to another without seals, where the shapes of the two layers at their interface or boundary are matched as closely as practicable.

The term "layer", as used herein, refers to a thickness of material laid on or spread over a surface. The term "conformal barrier coating layer" as used herein refers to each layer within the conformal barrier coating, in which one layer is touching and/or bonding to another layer, where the shapes of the two layers at their interface or boundary are matched as closely as possible.

The term "dielectric material", as used herein, refers to a material that is an electric insulator.

The term "electrochemical cell", as used herein, refers to a cell which consists of two electrodes immersed in an ionically conducting electrolyte, and in which a chemical reaction occurs that either generates or consumes electrical current. When a current capable of doing work is generated, it is a voltaic or galvanic cell, and when current is consumed it is an electrolytic cell.

The term "electrochemical cell stack", as used herein, refers to a basic unit component of an electrochemical battery consisting of positive and negative electrodes, an associated current collector for each electrode, a porous separator, and an electrolyte.

The term "electrolyte", as used herein, refers to an ionic conductor which can be in the solid state, the liquid state (most common) or more rarely a gas (e.g., plasma). According to one embodiment of the invention the electrolyte is liquid, specifically an ionic liquid.

The term "electrode", as used herein, refers to a structure through which charges are carried by electromotive force. Electrodes may be composed of one or more metal, carbon, and/or a semiconductor. Electrodes are solid and can store charge through electrochemical charge transfer of ions and electrons or through capacitative formation of a double layer.

The term "high surface area filler", as used herein, refers to a substance that increases pore volume of the porous separator and salt dissociation of the electrolyte.

The term "hermetic agent", as used herein, refers to a substance that can be used to provides closure of a surface, for example a coating, which is impervious to outside interference or influence by substantially limiting the escape or entry of gases and liquids over time.

The term "hermetic seal", as used herein, refers to a closure of a surface with a material, for example a coating, which is impervious to outside interference or influence by substantially limiting the escape or entry of gases and liquids over time.

The term "packaging", as used herein, refers to a means of containment of a given product to protect the product from contact with ambient atmosphere.

The term "packaging material", as used herein, refers to a substance suitable for use when a means of containment of a given product is manufactured.

The term "Seebeck coefficient" as used herein, refers to thermopower of a material that represents the magnitude of an induced thermoelectric voltage in response to a temperature difference across that material and entropy per charge carrier in the material. (Rockwood, Alan L., "Relationship of thermoelectricity to electronic entropy". Phys. Rev. A 30 (5): 2843-4 (1984)).

The term "Soret effect", as used herein, refers to a phenomenon observed when a micture of two or more mobile components is subjected to a temperature gradient.

Electrochemical Device

According to one aspect, the described invention provides a packaged electrochemical device comprising: an electrochemical cell, wherein the electrochemical cell further comprises:
  (a) an electrolyte comprising an ionic liquid;
  (b) at least one electrochemical cell stack, further comprising:
    (1) a first layer containing a positive electrode;
    (2) a second layer containing a porous separator;
    (3) a third layer containing a negative electrode,
  and
  (c) a barrier packaging material comprising at least one conformal barrier coating layer.

According to one embodiment, the packaged electrochemical device can be of any shape. Exemplary shapes include, but are not limited to three dimensional shapes with multiple angles and/or curved surfaces, such as shapes resembling patches, prismatic designs, etc. and where such shape is flexible.

According to one embodiment, the packaged electrochemical device can be of any size. For example, size can range between 50 microns and 100 mm in width, 50 microns and 100 mm in length, and 50 microns and 100 mm in depth.

According to one embodiment, the electrochemical cell comprises from 1 to 1,000 electrochemical cell stacks arranged in parallel. According to one embodiment, the electrochemical cell comprises from 1 to 1,000 electrochemical cell stacks arranged in series.

An Electrochemical Cell

According to one embodiment, the packaged electrochemical device comprises an electrochemical cell. According to some embodiments, the electrochemical cell is selected from the group consisting of a battery cell, an electrochemical capacitor cell, or a thermogalvanic cell. According to one embodiment, the electrochemical cell is a battery cell. Exemplary battery cells include, but are not limited to, a lithium ion electrochemical cell, a magnesium electrochemical cell, an aluminum electrochemical cell, a zinc electrochemical cell a fluoride electrochemical cell, etc. According to one embodiment, the battery cell is a lithium-ion cell. According to another embodiment, the electrochemical cell is an electrochemical capacitor cell. According to one embodiment, the electrochemical capacitor cell is a supercapacitor cell. According to another embodiment, the electrochemical capacitor cell is an ultracapacitor cell. According to another embodiment, the electrochemical capacitor cell is an electric double-layer capacitor (EDLC) cell. According to another embodiment, the electrochemical capacitor cell is a pseudocapacitor cell. According to another embodiment, the electrochemical capacitor cell is an asymmetric hybrid capacitor cell.

According to another embodiment, the electrochemical cell is a thermogalvanic cell. According to one embodiment, the packaged electrochemical device comprising the thermogalvanic cell extracts power from an interface of a pair of two mediums providing a temperature gradient. Exemplary pairs of media providing the thermal gradient include, but are not limited to, a person's skin and air; a phone and air; ground and air; a light bulb and air; a heating duct and air; a laptop and air; an eyeglass frame and a side of a head, etc. As the temperature gradient disappears, the electrochemical device continues to provide some power, e.g. in a reserve mode, since the and hermetically packaged electrochemical device can also store energy without the use of an external battery or power processing unit. According to one embodiment, the temperature gradient ranges from −40° C. to 200° C.

Non limiting examples of the implementation of the technique are described in the examples below for the construction of a single cell of a battery or supercapacitor. The construction is described for a single cell, but various other configurations can be imagined to those skilled in the art such as multiple single cells in a single pacakage, bicell configurations where a single current collector is shared among two cell sharing a common electrode, and bipolar cells where cells can be built in series utilizing a shared current collector.

According to another embodiment, the electrochemical cell comprises:
  (a) an electrolyte comprising an ionic liquid;
  (b) at least one electrochemical cell stack further comprising:
    (1) a first layer containing a positive electrode;
    (2) a second layer containing a porous separator;
    (3) a third layer containing a negative electrode,
    (4) a positive current collector associated with the positive electrode; and
    (5) a negative current collector associated with the negative electrode;
  and
  (c) a barrier packaging material comprising at least one conformal barrier coating layer.

(i) An Electrolyte Comprising an Ionic Liquid

According to one embodiment, the packaged electrochemical device comprises (i) an electrolyte. According to some embodiments, the electrolyte is an ionic liquid. Ionic liquids are ionic salts that remain stable under vacuum conditions found during the deposition process. Exemplary ionic liquid electrolytes have been described in A. Lewandowski and A. Swiderska-Mocek, "Ionic liquids as electrolytes for Li-ion batteries—An overview of electrochemical studies", J. Power Sources, 194, 601-609 (2009), V. Baranchugov, E. Markevich, E. Pollak, G. Salitra, and D. Aurbach, "Amorphous silicon thin films as high capacity anodes for Li-ion batties in ionic liquid electrolytes", Electrochem. Comm., 9, 796-800 (2007), H. Sakaebe and H. Matsumoto, "N-Methyl-N-propylpiperidinium bis(trifluoromethanesulfonyl)imide (PP13-TFSI)—novel electrolytebase for Li battery", Electrochem. Comm., 5, 594-598 (2003), H. Matsumoto, H. Sakaebe, K. Tatsumi, M. Kikuta, E. Ishiko, M. Kono, "Fast cycling of Li/LiCoO$_2$ cell with low viscosity ionic liquids based on bis(fluorosulfonyl)imide [FSI]-", J. Power Sources, 160, 1308-1313 (2006), H. Sakaebe, H. Matsumoto, K. Tatsumi, "Application of room temperature ionic liquids to Li batteries", Electrochimica Acta, 53, 1048-1054 (2007), and Y. NuLi, J. Yang, J. Wang, J. Xu, and P. Wang, "Electrochemical Magnesium Deposition and Dissolution with High Efficiency in Ionic Liquid", Electroch. And Solid State letters, 8, C166-C169, (2005). The entire disclosure of each of these publications is incorporated herein by reference.

According to some embodiments, the ionic liquid further comprises a dissolved salt. According to some such embodiments, the dissolved salt contains cations including, but are not limited to, cations of Li$^+$, Mg$^{2+}$, Ca$^{2+}$, Al$^{3+}$, Zn$^{2+}$, Y$^{3+}$, Tetra alkyl ammonium$^+$, etc.

Additional exemplary cations of the cation-containing ionic salts include, but are not limited to, an imidazolium cation (RRIm$^+$), a pyridinium cation (RRPy$^+$), a pyrrazolium cation (RRRPyrraz$^+$), a pyrrolidinium cation (RRPyrrol$^+$), a piperidinium cation (RRPip$^+$), a dicationic species. Exemplary imidazolium cations (RRIm$^+$) include, but are not limited to, [EtMeIm$^+$] 1-Ethyl-3-methylimidazolium cation, [BuMeIm$^+$] 1-Butyl-3-methylimidazolium cation, [Me2PrIm$^+$] 1,2-Dimethyl-3-propylimidazolium cation, [Et2Me2Im$^+$] 1,2-Diethyl-3,4-dimethylimidazolium cation, [MeRIm$^+$] 1-Methyl-3-alkylimidazolium cation, [BuMe2Im$^+$] 1,2-Dimethyl-3-butylimidazolium cation, [CMMeIm+] 1-Cyanomethyl-3-methylimidazolium cation, [CPMeIm$^+$] 1-Cyanopropyl-3-methylimidazolium cation, etc. Exemplary pyridinium cations (RRPy$^+$) include, but are not limited to, [BuMePy$^+$] N-butyl-4-methylpyridinium cation, [MePrPy$^+$] N-methyl-N-propylpyridinium cation, [BuPy$^+$] N-butylpyridinium cation, Tetraalkylammonium cations (RRRRN$^+$), [Et$_2$MeMeON$^+$] N,N,-diethyl-N-methyl-N-(2-methoxyethyl)ammonium cation, [Me$_3$HexN$^+$] Trimethylhexylammonium cation, [CMMe3N$^+$] N-cyanomethyl-N,N,N-trimethylammonium cation, [CEMe$_3$N$^+$] N-cyanoethyl-N,N,N-trimethylammonium cation, [Me$_3$PrN$^+$] Trimethylpropylammonium cation, [MeEt$_2$MetoxyEtN$^+$] N-methyl-N,N-diethyl-N-(methoxyethylene)ammonium cation, [Am$_4$N$^+$] Tetraamylammonium cation, etc. Exemplary pyrrazolium cations (RRRPyrraz$^+$) include, but are not limited to, [Et$_2$MePyrraz$^+$] N,N,-diethyl-3-methylpyrazolium cation. Exemplary pyrrolidinium cations (RRPyrrol$^+$) include, but are not limited to, [MePrPyrrol$^+$] N-methyl-N-propylpyrrolidinium cation, [BuEtPyrrol+] N-n-butyl-N-ethylpyrrolidinium cation, [BuMePyrrol$^+$] N-n-butyl-N-methylpyrrolidinium cation, etc. Exemplary piperidinium cations (RRPip$^+$) include, but are not limited to, [MePrPip$^+$] N-methyl-N-propylpiperidinium cation, [BuMePip$^+$] N-butyl-N-methylpiperidinium cation, etc. Exemplary dicationic species include, but are not limited to, [MeIm$^+$-R-Me3N+] 1-(3-Methylimidazolium-1-alkyl(trimethylammonium) cation, etc.

According to some such embodiments, the ionic liquid and dissolved salts contain anions, which may or not be of identical composition. Exemplary anions include, but are not limited to [BF$_4^-$] Tetrafluoroborate anion, [PF$_6^-$] Hexafluorophosphate anion, [NF$^{2-}$]; [N(F$_2$SO$_2$)$^{2-}$] Bis(fluorosulfonyl)imide anion, [NPF2$^-$]; [N(C$_2$F$_5$SO$_2$)$^{2-}$] Bis (perfluoroethylsulfonyl)imide anion, [NTF$^{2-}$]; [N(CF$_3$SO$_2$)$^{2-}$] Bis(trifluoromethanesulfonyl)imide anion, [OTF$^-$]; [CF$_3$SO$_3^-$] Triflate anion, Tetrachloroaluminate anion, [TSAC$^-$] 2,2,2-Trifluoro-N-(trifluoromethylsulfonyl)acetamide, aluminum chloride (AlCl$_4^-$), Cl$^-$, F$^-$, S$^{2-}$, etc.

For example, in the case of a lithium ion battery cell, the ionic liquid electrolyte is prepared by the following method: a lithium salt (0.1-3M) is dispersed in an ionic liquid of PP13 (N-methyl-N-propylpiperidinium) or (N-methyl-N-propylpyridinium) cation with the ionic liquid and lithium salt containing a (bis(trifluoromethanesulfonyl)imide) or BF$_4^-$ anion.

It is evident to those skilled in the art that the selection of a proper ionic liquid electrolyte for use in such energy storage devices will be dependent on the stability of the ionic liquid within the electrochemical potential window of the selected electrode couple. The stability of the ionic liquid electrolyte can be of an intrinsic nature or through the ability of the ionic liquid or additive to decompose on one or both electrodes. This results in the formation of an ionically conducting passivation layer commonly referred to as the solid electrolyte interphase. This self limited coating prevents further decomposition of the ionic liquid electrolyte on the surface of each electrode.

(ii) at Least One Electrochemical Cell Stack

According to one embodiment, the at least one electrochemical cell stack further comprises: (1) a first layer containing a positive electrode; (2) a second layer containing a porous separator; and (3) a third layer containing a negative electrode, such that the second layer is bonded between the first and third layers.

Electrodes

A large number of electrodes can be utilized in batteries and supercapacitors. A selection of electrodes is shown in Wang et al. (G. Wang, L. Zhang, and J. Zhang, "A review of Electrode Materials for Electrochemical Supercapacitors", Chem. Soc. Rev., 41, 797-828 (2012)) for supercapacitors and others for lithium and magnesium batteries. (B. Ellis, K. Lee, and L. Nazar, "Positive Electrode Materials for Li-ion and Li-Batteries", Chem. Mater., 22, 691-714, (2010); W. Zhang, "A review of the Electrochemical performance of alloy anodes for lithium batteries", J. Power Sources, 196, 13-24 (2011); J.-M. Tarascon and M. Armand, "Issues and challenges faciong rechargeable lithium batteries", Nature, 414, 359 (2001); G. G. Amatucci, N. Pereira, "Fluoride based electrode materials for afvanced energy storage devices", J. Fluorine Chemistry, 128, 243-262 (2007); R. Doe, T. Mueller, G. Ceder, J. Barker, and K. Persson, "Electrode materials for magnesium batteries", WO/2011/150093; J.-M. Tarascon, A. S. Gozdz, C. Schmutz, F. Shokoohi, and P. C. Warren, "Performance of Bellcore's Plastic Rechargeable Li-ion Battery", Solid State Ionics, 86-88, 49-54 (1996)), N. Jayaprakash, S. K. Das, and L. A. Archer, The rechargeable aluminum-ion battery, Chem. Commun., 2011, 47, 12610-12612, CC Ho, J. W Evans, and PK Wright, Direct write dispenser printing of a zinc microbattery with an ionic liquid gel electrolyte, J. Micromech Microeng, 20 (2010), 104009, each of which is incorporated by reference.

According to one embodiment, each electrode is composed of an electrode composition comprising a mixture of an electrochemically "active" material, a conductive material, and a binder. The term "electrochemically active material", as used herein, refers to a material capable of undergoing a chemical treaction that either consumes or generates electrical current. When current is generated, it is a voltaic or galvanic material. When current is consumed, it is an electrolytic material. For example, for a battery cell, the electrochemically "active" material includes, but are not limited to, $LiCoO_2$ and graphite for the positive and negative electrodes, respectively; for a hybrid asymmetric capacitor, the electrochemically "active" material includes, but are not limited to, activated carbon and $Li_4Ti_5O_{12}$. Each electrode is cast and dried. The term "conductive material", as used herein, refers to a material capable of assisting the conduction of electrons through the fabricated electrode to the electrochemically "active" material. Exemplary conductive materials include, but are not limited to, carbon black. The term "binder", as used herein, refers to a material which helps provide consistency, cohesion or mechanical strength. Exemplary binders include, but are not limited to, poly(vinylidenedifluoride-hexafluoropropylene (PVdF-HFP). The term "plasticizer", as used herein, refers to an agent which when added to a material, increases pliable or flexible properties of the material Exemplary plasticizers include, but are not limited to, dibutyl phthalate and propylene carbonate. The term "solvent", as used herein, refers to a liquid which dissolves the binder utilized in the electrode fabrication. Exemplary solvents include, but are not limited to, acetone and n-methylpyrrolidinone.

According to some embodiments, each electrode can range in size from 1 micron to 1,000 microns in width. According to some embodiments, each electrode can range in size from 10 microns to 1 meter in length.

Current Collector

According to some embodiments, each electrode is optionally associated with a current collector. According to some such embodiment, the positive electrode is optionally associated with a positive current collector. According to some such embodiments, the negative electrode is optionally associated with a negative current collector. The term "current collector", as used herein, refers to a material that collects electrons or ions from the electrode and facilitates their transfer to an external lead that extends to outside the packaging of the electrochemical battery to an external circuit. Exemplary current collectors include, but are not limited to, metal, carbon, etc. For example, metal current collectors that can be employed for Li-ion batteries include aluminum, palladium, gold, stainless steel or titanium for the positive electrode and copper, nickel, titanium or molybedenum for the negative electrode. Carbon current collectors afford the application of cell mechanical flexibility, and various mixtures of carbon blacks, graphites and especially graphene, single or multi-walled carbon nanotubes are useful to this invention. The term "carbon nanotube", as used herein, refers to an allotrope form of carbon arranged in a manner that forms a nanostructured cylinder. According to one embodiment, the current collector is applied as a separate layer to each electrode by mixing with a binder and a solvent. According to another embodiment, the current collector is added to the electrode composition in a range of at least 0.1 weight % to at least 20 weight % of the composition. According to another embodiment, the current collector is added to the electrode composition in a range of at least 0.1 weight % to at least 5 weight % of the composition.

Porous Separator

According to one embodiment, the porous separator further comprises a separator composition comprising a mixture of a binder, a high surface area filler which increases pore volume and electrolyte salt dissociation (for e.g. fumed silica), a plasticizer, and a solvent. The porous separator is also cast and dried. Exemplary binders includes but are not limited to poly(vinylidenedifluoride-hexafluoropropylene (PVdF-HFP). Such separator compositions are known in the art to afford bonding of the porous separator to the electrodes (see, e.g., Gozdz et al U.S. Pat. No. 7,794,511). For example, the separator composition can be deposited on a porous olefien such as polypropylene or polyethylene commonly utilized as separators for lithium-ion cells to afford bonding properties to these non-binding separators. Exemplary high surface area fillers include, but are not limited to, high surface fumed silica, high surface fumed alumina, etc. Exemplary plasticizers include, but are not limited to, dibutyl phthalate, propylene carbonate, etc. Exemplary solvents include, but are not limited to, acetone, n-methyl pyrrolidinone, etc.

According to some embodiments, the porous separator can range in size from 1 micron to 100 microns in thickness. According to some embodiments, the porous separator can range in size from 10 microns to 1 meter in length.

Electrolyte

According to some embodiments, the at least one electrochemical cell stack further comprises the electrolyte comprising the ionic liquid. According to some such embodiments, the at least one electrochemical cell stack is a bonded microporous electrochemical cell stack that has the ability to store the electrolyte comprising the ionic liquid within its pores. According to one such an embodiment, the electrochemical cell stack does not have pooled electrolyte on its surface. This simplifies the deposition of the conformal coating, such as parylene and allows the best utilization of the electrochemical cell volume. Exemplary pore size ranges between 1 nm and 50 microns.

(iii) A Barrier Packaging Material

According to one embodiment, the electrochemical cell further comprises (iii) a barrier packaging material comprising at least one conformal barrier coating layer.

According to one embodiment, the conformal barrier coating layer is a first conformal barrier coating layer that is directly deposited on the at least one electrochemical cell stack. According to one embodiment, direct deposition of the first conformal barrier coating layer on the at least one electrochemical cell stack ensures that a continuous barrier is achieved. The term "barrier", as used herein, refers to a means to prevent reaction of an electrochemical cell, contained within a packaged electrochemical device, with the ambient atmosphere. According to another embodiment, direct deposition of the first conformal barrier coating layer on the at least one electrochemical cell stack ensures that a continuous hermetic seal is achieved without destruction of the electrolyte and without formation of a visible seal volume. The term "hermetic seal", as used herein, refers to a closure of a surface with a material, for example a coating, which is impervious to outside interference or influence by substantially limiting the escape or entry of gases and liquids over time. The term "seal volume", as used herein, refers to a volume of material required to bond two or more layers of barrier packaging material together. The deposition process takes place under the presence of heat and vacuum; a solid dimer of the barrier packaging material is formed into a dimeric gas, pyrolized to leave the dimer in its monomeric form, and then deposited as a polymerized clear film. This allows a conformal deposition of the barrier packaging material to form each conformal barrier coating layer. According to some embodiments, the first conformal barrier coating layer comprises at least one para-xylylene polymer variant. The deposition process using a para-xylylene polymer variant requires that the substrate to be coated is placed in a vacuum chamber, which experiences a vacuum on the order of a few mtorr. Under such conditions, the electrolyte from the electrochemical cell can be prone to evaporation and severe degradation of performance. Such limitations are overcome by the use of ionic liquid electrolytes with little or no measurable vapor pressure, i.e., they are ionic salts that are molten at room temperature. According to one embodiment, the conformal barrier coating layer is deposited at a pressure of less than one atmospheric pressure.

According to some embodiments, the conformal barrier coating layer comprises at least one para-xylylene polymer variant. Exemplary para-xylylene polymer variants include, but are not limited to, parylene N (para-xylenene polymer), parylene C (para-chloroxylylene polymer), parylene D (para-dichloroxylylene polymer), PARYLENE HT® (para-α-difluoroxylylene polymer, Speciality Coating Systems, Inc., Indianapolis, Ind.), poly(trifluoro-paraxylylene), poly(paraxylylene-co-trifluoroethylene paraxylylene), poly(4-3,3,4,4,5,5,6,6,7,7,8,8-tridecafluorooctan paraxylylene), poly(bromo-diphenyl-paraxylylene), poly(SO₃H-diphenyl paraxylylene), poly(diphenyl paraxylylene alcohols), poly-COOH diphenyl paraxylylene polymer, COOMe-diphenyl paraxylylene polymer, stilbene diphenyl paraxylylene polymer, etc. Exemplary paraxylylene variants have been described in U.S. Pat. No. 7,994,372 and E. Meng, P-Y Li, and Y-C. Tai, "Plasma Removal of Parylene C", J. Micromech. Microeng., 18, 1, (2008), the entire disclosure of which is incorporated herein by reference. Nonlimiting examples of paralyene structures include:

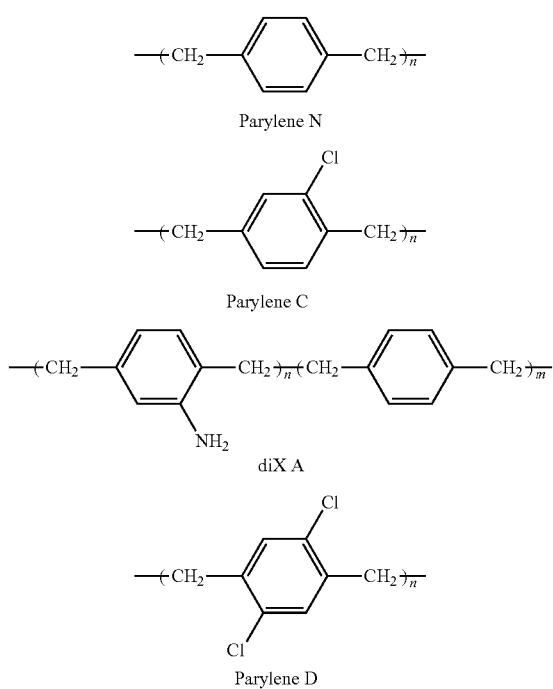

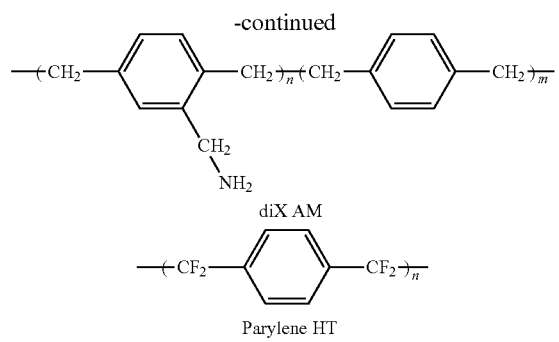

According to some embodiments, the barrier packaging material comprises at least one conformal barrier coating layer. According to some embodiments, the first conformal barrier coating layer is at least 5 microns to at least 100 microns thick. According to some such embodiments, the first conformal coating on the electrochemical cell is at least 2 microns to at least 50 microns thick. According to some such embodiments, the first conformal coating on the electrochemical cell is at least 2 microns to at least 25 microns thick. According to some such embodiments, the first conformal coating on the electrochemical cell is at least 5 microns to at least 30 microns thick. According to one embodiment, the first conformal barrier coating layer on the electrochemical cell is at least 5 microns thick. According to another embodiment, the first conformal barrier coating layer on the electrochemical cell is at least 10 microns thick. According to another embodiment, the first conformal barrier coating layer on the electrochemical cell is at least 15 microns thick. According to another embodiment, the first conformal barrier coating layer on the electrochemical cell is at least 20 microns thick. According to another embodiment, the first conformal barrier coating layer on the electrochemical cell is at least 25 microns thick. According to another embodiment, the first conformal barrier coating layer on the electrochemical cell is at least 30 microns thick. According to another embodiment, the first conformal barrier coating layer on the electrochemical cell is at least 35 microns thick. According to another embodiment, the first conformal barrier coating layer on the electrochemical cell is at least 40 microns thick. According to another embodiment, the first conformal barrier coating layer on the electrochemical cell is at least 45 microns thick. According to another embodiment, the first conformal barrier coating layer on the electrochemical cell is at least 50 microns thick. According to another embodiment, the first conformal barrier coating layer on the electrochemical cell is at least 55 microns thick. According to another embodiment, the first conformal barrier coating layer on the electrochemical cell is at least 60 microns thick. According to another embodiment, the first conformal barrier coating layer on the electrochemical cell is at least 65 microns thick. According to another embodiment, the first conformal barrier coating layer on the electrochemical cell is at least 70 microns thick. According to another embodiment, the first conformal barrier coating layer on the electrochemical cell is at least 75 microns thick. According to another embodiment, the first conformal barrier coating layer on the electrochemical cell is at least 80 microns thick. According to another embodiment, the first conformal barrier coating layer on the electrochemical cell is at least 85 microns thick. According to another embodiment, the first conformal barrier coating layer on the electrochemical cell is at least 90 microns thick. According to another embodiment, the first conformal barrier coating layer on the electrochemical cell is at least 95 microns thick. According to another embodiment, the first conformal barrier coating layer on the electrochemical cell is at least 100 microns thick.

According to some embodiments, the conformal barrier coating layer comprises a second conformal coating layer that is directly deposited on the first conformal barrier coating layer. According to some such embodiments, the second conformal barrier coating layer comprises a barrier agent. The term "barrier agent", as used herein, refers to refers to a substance that prevents reaction of an electrochemical cell, contained within a packaged electrochemical device, with the ambient atmosphere. According to some such embodiments, the barrier agent is a hermetic agent. The term "hermetic agent", as used herein, refers to a substance that can be used to provides closure of a surface, for example a coating, which is impervious to outside interference or influence by substantially limiting the escape or entry of gases and liquids over time. Exemplary hermetic agents include, but are not limited to, copper, aluminum, titanium, bisumuth, gallium or other useful barrier metals, inorganic coatings such as aluminium oxide, or graphene. According to some embodiments, the second conformal barrier coating layer is at least 0.1 micron thick. According to another embodiment, the second conformal barrier coating layer is at least 2 microns thick. According to another embodiment, the second conformal barrier coating layer is at least 3 microns thick. According to another embodiment, the second conformal barrier coating layer is at least 4 microns thick. According to another embodiment, the second conformal barrier coating layer is at least 5 microns thick. According to another embodiment, the second conformal barrier coating layer is at least 6 microns thick. According to another embodiment, the second conformal barrier coating layer is at least 7 microns thick. According to another embodiment, the second conformal barrier coating layer is at least 8 microns thick. According to another embodiment, the second conformal barrier coating layer is at least 9 microns thick. According to another embodiment, the second conformal barrier coating layer is at least 10 microns thick.

According to some embodiments, the conformal barrier coating layer contains a third conformal barrier coating layer that is directly deposited on the second conformal coating layer. According to some such embodiments, the third conformal barrier coating layer comprises at least one para-xylylene polymer variant. Exemplary para-xylylene polymer variants include, but are not limited to, the aforementioned parylene N, parylene C, parylene D, PARYLENE HT®, poly(trifluoro-paraxylylene), poly(paraxylylene-co-trifluoroethylene paraxylylene, poly(4-3,3,4,4,5,5,6,6,7,7,8,8-tridecafluorooctan paraxylylene), poly bromo-diphenyl-paraxylylene, poly $SO_3H$-diphenyl paraxylylene, poly diphenyl paraxylylene alcohols, poly-COOH diphenyl paraxylylene, COOMe-diphenyl paraxylylene, stilbene diphenyl paraxylylene, etc. Exemplary paraxylylene variants have been described in U.S. Pat. No. 7,994,372 and E. Meng, P-Y Li, and Y-C. Tai, "Plasma Removal of Parylene C", J. Micromech. Microeng., 18, 1, (2008), the entire disclosure of which is incorporated herein by reference.

According to some embodiments, the third conformal barrier coating layer is at least 0.1 micron to at least 20 microns thick. According to one embodiment, the third conformal barrier coating layer is at least 0.1 micron thick. According to another embodiment, the third conformal barrier coating layer is at least 0.2 micron thick. According to another embodiment, the third conformal barrier coating layer is at least 0.3 micron thick. According to another embodiment, the third conformal barrier coating layer is at least 0.4 micron thick. According to another embodiment, the third conformal barrier coating layer is at least 0.5 micron thick. According to another embodiment, the third conformal barrier coating layer is at least 0.6 micron thick. According to another embodiment, the third conformal barrier coating layer is at least 0.7 micron thick. According to another embodiment, the third conformal barrier coating layer is at least 0.8 micron thick. According to another embodiment, the third conformal barrier coating layer is at least 0.9 micron thick. According to another embodiment, the third conformal barrier coating layer is at least 1.0 micron thick. According to another embodiment, the third conformal barrier coating layer is at least 2.0 microns thick. According to another embodiment, the third conformal barrier coating layer is at least 4.0 microns thick. According to another embodiment, the third conformal barrier coating layer is at least 6.0 microns thick. According to another embodiment, the third conformal barrier coating layer is at least 4.0 microns thick. According to another embodiment, the third conformal barrier coating layer is at least 8.0 microns thick. According to another embodiment, the third conformal barrier coating layer is at least 10.0 microns thick. According to another embodiment, the third conformal barrier coating layer is at least 12.0 microns thick. According to another embodiment, the third conformal barrier coating layer is at least 14.0 microns thick. According to another embodiment, the third conformal barrier coating layer is at least 16.0 microns thick. According to another embodiment, the third conformal barrier coating layer is at least 20.0 microns thick.

According to some embodiments, the conformal barrier coating layer comprises a fourth conformal coating layer that is directly deposited on the third conformal coating layer. According to some such embodiments, the fourth conformal barrier coating layer comprises a barrier agent. According to some such embodiments, the barrier agent is a hermetic agent. Exemplary hermetic agents include, but are not limited to, copper, aluminum, titanium, bisumuth, gallium or other useful barrier metals, inorganic materials such as aluminium oxide, or graphene. According to some embodiments, the fourth conformal barrier coating layer is at least 1 micron to at least 10 microns thick. According to one embodiment, the fourth conformal barrier coating layer is at least 1 micron thick. According to another embodiment, the fourth conformal barrier coating layer is at least 2 microns thick. According to another embodiment, the fourth conformal barrier coating layer is at least 3 microns thick. According to another embodiment, the fourth conformal barrier coating layer is at least 4 microns thick. According to another embodiment, the fourth conformal barrier coating layer is at least 5 microns thick. According to another embodiment, the fourth conformal barrier coating layer is at least 6 microns thick. According to another embodiment, the fourth conformal barrier coating layer is at least 7 microns thick. According to another embodiment, the fourth conformal barrier coating layer is at least 8 microns thick. According to another embodiment, the fourth conformal barrier coating layer is at least 9 microns thick. According to another embodiment, the fourth conformal barrier coating layer is at least 10 microns thick.

According to some embodiments, the conformal barrier coating layer contains a fifth conformal barrier coating layer that is directly deposited on the second conformal coating layer. According to some such embodiments, the third conformal barrier coating layer comprises at least one para-xylylene polymer variant. Exemplary para-xylylene polymer variants include, but are not limited to, the aforementioned parylene N, parylene C, parylene D, PARYLENE HT®, poly(trifluoro-paraxylylene), poly(paraxylylene-co-trifluoroethylene paraxylylene, poly(4-3,3,4,4,5,5,6,6,7,7,8,8-tridecafluorooctan paraxylylene), poly bromo-diphenyl-paraxylylene, poly SO₃H-diphenyl paraxylylene, poly diphenyl paraxylylene alcohols, poly-COOH diphenyl paraxylylene, COOMe-diphenyl paraxylylene, stilbene diphenyl paraxylylene, etc. Exemplary paraxylylene variants have been described in U.S. Pat. No. 7,994,372 and E. Meng, P-Y Li, and Y-C. Tai, "Plasma Removal of Parylene C", J. Micromech. Microeng., 18, 1, (2008), the entire disclosure of which is incorporated herein by reference.

According to some embodiments, the fifth conformal barrier coating layer is at least 0.1 micron to at least 20 microns thick. According to one embodiment, the fifth conformal barrier coating layer is at least 0.1 micron thick. According to another embodiment, the fifth conformal barrier coating layer is at least 0.2 micron thick. According to another embodiment, the fifth conformal barrier coating layer is at least 0.3 micron thick. According to another embodiment, the fifth conformal barrier coating layer is at least 0.4 micron thick. According to another embodiment, the fifth conformal barrier coating layer is at least 0.5 micron thick. According to another embodiment, the fifth conformal barrier coating layer is at least 0.6 micron thick. According to another embodiment, the fifth conformal barrier coating layer is at least 0.7 micron thick. According to another embodiment, the fifth conformal barrier coating layer is at least 0.8 micron thick. According to another embodiment, the fifth conformal barrier coating layer is at least 0.9 micron thick. According to another embodiment, the fifth conformal barrier coating layer is at least 1.0 micron thick. According to another embodiment, the fifth conformal barrier coating layer is at least 2.0 microns thick. According to another embodiment, the fifth conformal barrier coating layer is at least 4.0 microns thick. According to another embodiment, the fifth conformal barrier coating layer is at least 6.0 microns thick. According to another embodiment, the fifth conformal barrier coating layer is at least 4.0 microns thick. According to another embodiment, the fifth conformal barrier coating layer is at least 8.0 microns thick. According to another embodiment, the fifth conformal barrier coating layer is at least 10.0 microns thick. According to another embodiment, the fifth conformal barrier coating layer is at least 12.0 microns thick. According to another embodiment, the fifth conformal barrier coating layer is at least 14.0 microns thick. According to another embodiment, the fifth conformal barrier coating layer is at least 16.0 microns thick. According to another embodiment, the fifth conformal barrier coating layer is at least 20.0 microns thick.

Method of Fabrication

According to another aspect, the present invention provides a method of fabricating a flexible and hermetically packaged electrochemical device, the method comprising:
  (A) providing at least one electrochemical cell stack by binding together:
    (1) a first layer containing a positive electrode;
    (2) a second layer containing a porous separator; and
    (3) a third layer containing a negative electrode; and
  (B) Introducing a liquid electrolyte of low vapor pressure; and
  (C) suspending the at least one electrochemical cell stack inside a chamber to deposit a first barrier packaging material, such that the first barrier packaging material forms a first conformal coating layer over the entire surface of the at least one electrochemical cell stack.

According to one embodiment, the first barrier packaging material is parylene.

According to one embodiment, the method further comprises:
  (C) introducing the at least one electrochemical stack coated by the first conformal coating layer from step (B) to a vacuum physical vapor deposition equipment that deposits a second barrier packaging material, such that the second barrier packaging material forms a second conformal coating layer over the entire surface of the at least one electrochemical cell stack coated by the first conformal coating layer.

According to one embodiment, the second barrier packaging material is a hermetic agent. According to one embodiment, the hermetic agent is a metal.

Method of Fabrication of a Thermogalvanic Cell

The packaged electrochemical device comprising the thermogalvanic cell is fabricated according to method steps 1-4, as described in Example 1. The packaged electrochemical device comprising the thermogalvanic cell extracts power from an interface of a pair of two mediums providing a temperature gradient. Exemplary pairs of medium providing the thermal gradient include, but are not limited to, a person's skin and air; a phone and air; ground and air; a light bulb and air; a heating duct and air; a laptop and air; an eyeglass frame and side of head, etc. As the temperature gradient disappears, the flexible and hermetically packaged electrochemical device continues to provide some power, e.g. in a reserve mode, since the hermetically packaged electrochemical device can also store energy without the use of an external battery or power processing unit. Various ionic liquids can be utilized to generate the necessary ionic conductivity required to support a storage-type thermogalvanic cell. Examples of ionic liquids include, but are not limited to, PP13 with 1M LiTFSI salt, etc. For a non-storage type thermogalvanic cell, various ionic liquids can be utilized. It is desired that such ionic liquid electrolytes will exhibit high Seebeck coefficients such that maximum useful energy can be derived from minimal temperature differentials. Compositions that are of interest are incorporated by reference from, for example, Abraham et al. (T. Abraham, D. MacFarlane, and J. Pringle, "Seebeck Coefficients in Ionic Liquids-Prospects for Thermo-electrochemical Cells", Chem. Commun., 47, 6260-6262, (2011)).

The packaged electrochemical device comprising the thermogalvanic cell can be in the form of a patch. The flexible patch according to the present invention offers a low-cost solution to the need for a long-term source of power with minimal maintenance to a wide array of industries, which are still struggling to find dependable power sources for devices of smaller and smaller sizes but whose energy needs are ever increasing. For example, the patch is useful in powering miniature topical and transdermal biomedical sensors, drug delivery devices, smart hearing aids, or a host of industrial and security sensors. The flexible and hermetically packaged thermogalvanic patch according to the present invention (A) harvests energy from the temperature gradient provided by the interface of the pair of two mediums and (B) stores the harvested energy offering a reserve of power even when the temperature gradient is removed.

(A) Harvesting Energy

Various material systems have been evaluated as effective thermoelectric devices. Most thermoelectric devices described in the art use electronic conducting low bandgap semiconductors with good thermal transport, which is not optimal because it becomes an issue at very low delta T scenarios where thermal conductivity becomes undesirable. As such, the best materials, such as bismuth tellurides, are not expected to exceed more than a few hundred µV/K. According to one embodiment, the flexible and hermetically packaged thermogalvanic patch modifies phonon disrupting properties of semiconductor materials to decrease the thermal conductivity and improve the ZT values. The ZT value is a principle figure of merit defined as: $ZT=TS^2_e(\sigma/\kappa)$ (1), where T is the temperature, $\sigma/\kappa$ is the electrical to thermal conductivity ratio, and S is the Seebeck coefficient. Seebeck coefficient, S, is the thermopower of a material that represents the magnitude of an induced thermoelectric voltage in response to a temperature difference across that material and entropy per charge carrier in the material. (Rockwood, Alan L., "Relationship of thermoelectricity to electronic entropy". Phys. Rev. A 30 (5): 2843-4 (1984)).

In contrast to the aforementioned traditional thermoelectric devices, thermoelectric effects have also been identified in liquid electrolytes between two electrodes. A temperature differential induces an ionic gradient in the electrolyte as described by the Soret effect. This then relates to an electrostatic solvent/salt Seebeck effect which exceeds that of traditional thermoelectric by 2 orders of magnitude for organic/inorganic solutions. Although these superior characteristics are counterbalanced by its 2 orders of magnitude lower electrical conductivity resulting in ZT values comparable to today's traditional thermoelectric, these liquid electrolytes offer the advantage of being more adept at establishing good performance under low delta T situations, such as one would find at the surface of one's skin. The temperature difference can range from 1 degree Celsius to 20 degrees Celsius. This is due to the importance of heat flow considerations:

$$V_{oc} = N \cdot S \cdot \Delta T = \frac{N \cdot S \cdot t \cdot (\text{heat flow})}{\kappa}.$$

Figure 3:
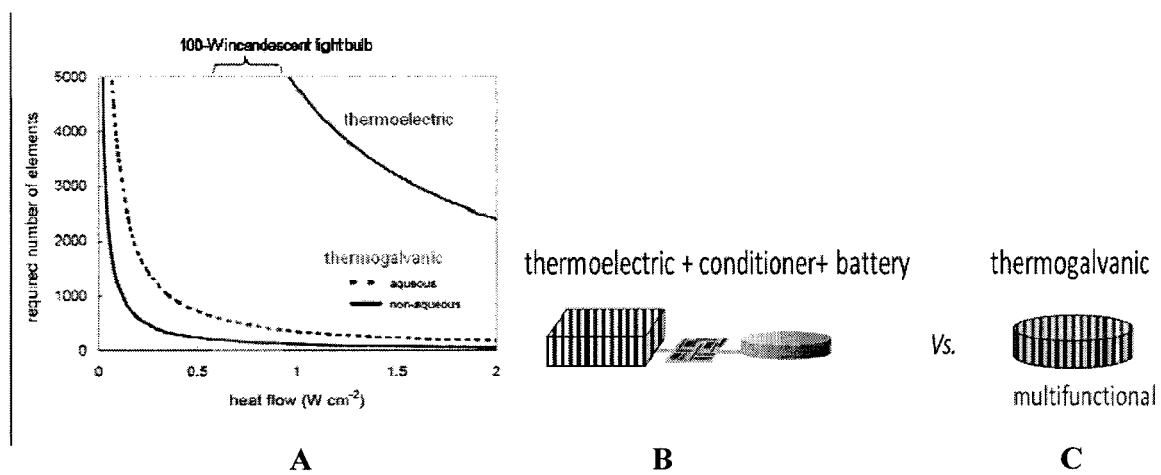
FIG. 3A shows a graph plotting required number of elements over heat flow ($W/cm^2$) in aqueous (dashed blue line) and non-aqueous (solid blue line) thermogalvanic cells and in thermoelectric cells (solid red line).
FIG. 3B shows a schematic representation of required components of a thermoelectric cell (thermoelectric cell+conditioner+battery) vs. a thermogalvanic cell (multifunctional one component).

According to one embodiment, the flexible and hermetically packaged thermogalvanic patch provides a solution in terms of low thermal conductivity required for ZT factor under low delta T situations. FIG. 3 demonstrates that one would not be able to extract much meaningful power with various distances from a small light bulb with a traditional semiconductor thermoelectric cell vs a liquid thermogalvanic cell. In short, a liquid based thermoelectric cell offers much promise for the advent of low temperature gradient energy harvesting.

(B) Storing the Harvested Energy

The perennial challenge with almost all energy harvesting is that "ambient energy" (the harvested energy source) is not always available. As such, there needs to be an additional energy storage device in the form of a battery or supercapacitor that can provide energy when the harvested energy source is not available. This also applies to a thermoelectric device in the absence of a thermal gradient. In large-scale applications, this deficiency is remedied by pairing the thermoelectric device with a separate battery and also a power conditioner device. The primary function of the power conditioner is to transform the thermoelectric output voltages that can vary over a wide range of voltage, as it is directly correlated to the temperature differential, into a fixed in-put voltage feeding the battery.

Although the addition of the battery and power conditioner adds cost to the system, it is not an inhibiting factor in large-scale applications. In sharp contrast, when one scales down the applications to about 1 cm$^2$, the added volume of a separate battery and power conditioner device becomes a major limitation to useful implementation. To address such issues, Hudak and Amatucci have demonstrated a functioning Li-ion battery system that is the chemistry of the liquid thermoelectric as a rechargeable thermogalvanic energy storage system. (N. Hudak and G. G. Amatucci, "Small Scale Energy Harvesting Through Thermoelectric, Vibration, and Radiofrequency Power Conversion" (Invited Review), J. Applied Phys., 103, 101301 (2008)). Each element of the thermoelectric is a Li-ion battery that is charged with the application of a small temperature differential. This eliminates the need for a separate battery and power conditioner and all of its volumetrically wasteful packaging. However, this has only been addressed for a single element of non-optimized chemistry. The flexible and hermetically packaged thermogalvanic patch according to the present invention can achieve a functioning voltage in excess of 2.0V with >10 cell stacks for a delta T of 10 degrees. This is a significant decrease compared to traditional thermoelectric systems, which would typically need 200-1000 cells in series for the same delta T of 10 degrees.

The flexible and hermetically packaged thermogalvanic patch according to the present invention can be placed on a person's skin to power various biomedical sensing/biomedical drug delivery/cosmetic applications. It also can be used as a ground sensor, can be wrapped on duct work to harvest energy for remote temperature and on vibration sensors, or can harvest infrared generated heat from the sun on surfaces by windows, etc.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any method and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning.

The publications discussed herein are provided solely for their disclosure prior to the filing date of the present application. Nothing herein is to be considered as an admission that the present invention is not entitled to antedate such publication by virtue of prior invention. Further, the dates of publication provided may be different from the actual publication dates which may need to be independently confirmed.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Method of Fabrication of a Porous Prebonded Electrochemical Cell

This example demonstrates a method of fabrication of a porous pre bonded electrochemical cell. Such an electrochemical cell can be represented by the so called "plastic technology" bonded batteries developed by Bellcore (J.-M. Tarascon, A. S. Gozdz, C. Schmutz, F. Shokoohi, and P. C. Warren, "Performance of Bellcore's Plastic Rechargeable Li-ion Battery", Solid State Ionics, 86-88, 49-54 (1996); A. DuPasquier, P. C. Warren, D. Culver, A. S. Gozdz, G. G. Amatucci, and J. M. Tarascon, "Plastic PVDF-HFP electrolyte laminates prepared by a phase inversion process" Solid State Ionics, 135, 249-257 (2000); A. DuPasquier, T. Zheng, G. G. Amatucci, and A. Gozdz, "Microstructure effects in plasticized electrodes based on PVDF-HFP for plastic Li-ion Batteries", J. Power Sorces, 97-98, 758-761, (2001)). The entire contents of each of the publications are incorporated herein as reference. A battery or an electrochemical capacitor cell stack is fabricated as follows. In Step 1, three layers, i.e, the positive and negative electrodes along with associated current collectors, and the porous separator, are bound together by heat and pressure. The positive and negative electrodes are composed of a mixture of the electrochemically "active" material along with a conductive carbon (carbon black) and a binder such as poly(vinylidenedifluoride-hexafluoropropylene (PVdF-HFP) in a suitable solvent such as acetone or n-methylpyrrolidinone along with a plasticizer such as dibutyl phthalate or propylene carbonate. For example, for a battery cell, the electrochemically "active" material includes, but is not limited to, $LiCoO_2$ and graphite for the positive and negative electrodes, respectively; for a hybrid asymmetric capacitor, the electrochemically "active" material includes, but is not limited to, activated carbon and $Li_4Ti_5O_{12}$. Each electrode is cast and dried. A porous separator, made of a binder along with a high suface area filler (for e.g. fumed silica), a suitable plasticizer, and solvent, is also cast and dried. Current collectors associated with each electrode can be composed of metal and/or carbon. Metal current collectors that can be employed for Li-ion batteries include aluminum, palladium, gold, stainless steel or titanium for the positive electrode and copper, nickel, titanium or molybedenum for the negative electrode. Carbon current collectors afford the application of cell mechanical flexibility, and various mixtures of carbon blacks, graphites and especially graphene, single or multiwalled nanotubes are useful to this invention. The carbons can be applied as a separate layer to the electrode by way of mixing with a polymer binder and solvent as described for the electrode itself. Alternatively, the carbons can be added to the electrode compositions in a range of 0.1-20 wt % of the composition, preferably in the range of 0.1-5 wt % of the composition. Afterwards the plasticizer is extracted from the cell by means of liquid, thermal or gas phase extraction. The now bonded cell contains porosity. This porosity is infiltrated with an ionic liquid electrolyte of the present invention. For example, in the case of Li-ion batteries an ionic liquid of PP13-TFSI with LiTFSI conductive salt or a composition of similar capabilities can be utilized. This completed unit, identified as a cell stack from hereon in, is the basic component of the electrochemical cell consisting of a positive electrode, a negative electrode, a porous separator, an electrolyte and a current collector for each electrode. (FIG. 1A) This unit is now ready for the application of a packaging to prevent infiltration of moisture and oxygen.

In Step 2, the cell stack is then suspended inside a parylene chamber where at least 1 micron to at least 100 microns of parylene is then deposited directly on the cell stack. (FIG. 1B) For example, a parylene deposition chamber useful for this step is a deposition chamber consistent in design as those manufactured by Specialty Coating Systems and other manufacturers known in the industry. If metal current collectors protrude from the cell, the surface of such metal can be pretreated with a known silane 3-(Trimethoxysilyl)propyl methacrylate adhesion treatment to enhance the adhesion of the polymerized parylene. For example, the material commercially available as "silane A-174" can be used for the silane pretreatments. The ends of the current collectors that will be exterior to the cell are masked to prevent adhesion of the electronically insulative parylene. After suspension and deposition, in step 3, the cell stack is then introduced to a high or medium vacuum of 10-7 torr to 10-1 torr in a physical vapor deposition equipment to deposit a uniform conformal coating layer of a hermetic agent, such as an inorganic agent e.g. a metal. (FIG. 1C) The layer thickness can range from 1-10 microns. Exemplary hermetic agents include, but are not limited to, copper, aluminum, titanium, bisumuth, gallium or other useful barrier metals, inorganic materials such as aluminium oxide, or graphene. The uniform coating of such metals can be maintained by rotating the cell in a directional deposition process or by the use of a non directional metal deposition process such as chemical vapor deposition. Alternatively, a uniform metal coating can be obtained by an electroless electrochemical deposition process, sol-gel process, or by dipping the cell into low temperature molten metals such as found in gallium alloy compositions.

After the metal deposition, in step 4, a top coat of Parylene, (e.g. 0.1 to 20 microns) can be deposited to yield a packaged and fabricated electrochemical cell. (FIG. 1D) In one embodiment, step 4 is followed by an additional sequence of metal and parylene deposition steps. The packaged and fabricated electrochemical cell according to above method steps has the following properties: (1) no distinct seal volume; 2) a continuous hermetic seal of the conformal coating (except the pass through for current collectors); (3) and excellent flexibility.

Example 2

Alternate Method of Fabrication of a Porous Prebonded Electrochemical Cell

The electrochemical cell stack is fabricated as described in Step 1 of Example 1. Method steps, as described in Steps 2-4 in Example 1 are then followed, except that the electrochemical cell stack from step 1 is laid against or prebonded on only one side to the single or multiple layers of alternate parylene and metal conformal coatings to yield an electrochemical cell with one side packaging. The electrochemical cell with one side packaging is then introduced into a parylene deposition chamber where parylene is deposited on the one side of the electrochemical cell with the single or multiple layers of alternate parylene and metal conformal coatings and simultaneously sealed around the perimeter to the underlying single or multiple layers of alternate parylene and metal conformal coatings. The electrochemical cell is then introduced into a metal barrier deposition chamber where a metal barrier is deposited on top of the one side. This is followed by another parylene layer deposition or a sequence of parylene/metal layer depositions.

Example 3

Alternate Method of Fabrication of a Li-Ion Battery

In the case of a Lithium ion battery cell, the electrochemical cell is fabricated according to method steps 1 and 2 described in Example 1. In order to utilize this configuration with a lithium battery, an electrochemical couple (i.e. positive and negative electrode materials) which has a voltage window which is more stable with respect to the oxidation and reduction window of water can be employed. Therefore if small amounts of water or oxygen do infiltrate through the packaging into the ionic liquid, the presence of these species will not cause catastrophic destruction of the cell's electrochemical performance. The existence of such stable electrodes are known in the art and are incorporated herein as referenced. (H. Manjunatha, G. S. Suresh, T. V. Venkatesha, "Electrode materials for aqueous rechargeable batteries", J. Solid State Electrochem., 431-445 (2011); S. Liu, H. Ye, C. Z. Li, G. L. Pan, and X. P. Gao, "Reachargeable Aqueous Lithium Ion-Battery of $TiO_2$/$LiMn_2O_4$ with a high voltage", J. Electrochem. Soc., 158, A1490-A1497 (2011); J. Luo and Y. Xia, "Aqueous lithium ion battery $LiTi_2(PO_4)_3$/$LiMn_2O_4$ with high power and energy densities as well as superior cycling stability", Adv. Funct. Mater., 17, 3877-3884 (2007); W. Li, J. R. Dahn, D. S. Wainwright, "Rechargeable Lithium Batteries with Aqueous Electrolytes", Science, 264, 1115 (1994)). Examples of useful electrodes include, but are not limited to, a lithium-maganese oxide ($LiMn_2O_4$) based positive electrode and a vanadium dioxide ($VO_2$) or a lithium titanium phosphate negative electrode. Such cells have lower voltage (usually less than 2V) as compared to cells employing existing state of the art materials (usually 4V), but afford a more practicable solution as compared to the latter. Coupled with the aforementioned ionic liquid compositions, the lithium ion battery cell is tolerant to small transfer rates of water and oxygen that may occur if a single conformal barier coating layer of Parylene is utilized. The use of a single conformal barrier coating layer greatly enhances the speed and simplicity which a conformal barrier coating can be applied as the above described multilayer approach will not be necessary. In a similar fashion, the symmetric electrodes chosen for the construction of the thermogalvanic cell can also operate within the electrochemical stability window of water as governed by the Nernst equation.

Example 4

Fabrication of Lithium Ion Battery with $LiMn_2O_4$ Positive Electrode and $Li_4Ti_5O_{12}$ Negative Electrode A lithium ion battery cell stack was fabricated as per the above described methodologies. Specifically a positive electrode of 46.5 wt % $LiMn_2O_4$ spinel, 13.3 wt % PVDF-HFP copolymer 2801, 6.7% carbon black (super P, MMM), and 33.5% propylene carbonate was dissolved in acetone, cast as an electrode and left to dry at room temperature. The negative electrode of $Li_4Ti_5O_{12}$ is prepared in a similar fashion except 49.6 wt % $Li_4Ti_5O_{12}$, 13.7 wt % PVDF-HFP copolymer 2801, 8.5% carbon black (super P, MMM), and 29.2% propylene carbonate was used as a formulation. The electrodes were then laminated at 120° C. to a separator (Celgard #A114-1200E-A) comprised of a porous polyolefin structure. The size of the cell enabled 0.174 g of positive electrode per cell stack with a 1.1 positive to negative matching ratio. The propylene carbonate plasticizer was extracted using dimethyl ether. The dried cell was then infiltrated with approximately 46 mg of 1M lithium bis-(trifluoromethanesulfonyl)-imide in ethyl-methyl-imidazolium, bis-(trifluoro-methanesulfonyl)-imide in an atmosphere of <5% relative humidity. The electrolyte imbibed cell was then coated with 33 microns of parylene C (Specialty Coating Systems, Inc., Indianapolis, Ind.) with a portion of each electrode protected from deposition to act as electrode current collector tabs.

Before fabrication, it was unknown whether the parylene would (1) fully polymerize on the surface of the wet electrolyte surface of the battery, offering an effective barrier to ambient atmosphere; and (2) whether components of the unreacted monomer or polymer would deleteriously effect with the electrochemistry of the device.

Figure 4:
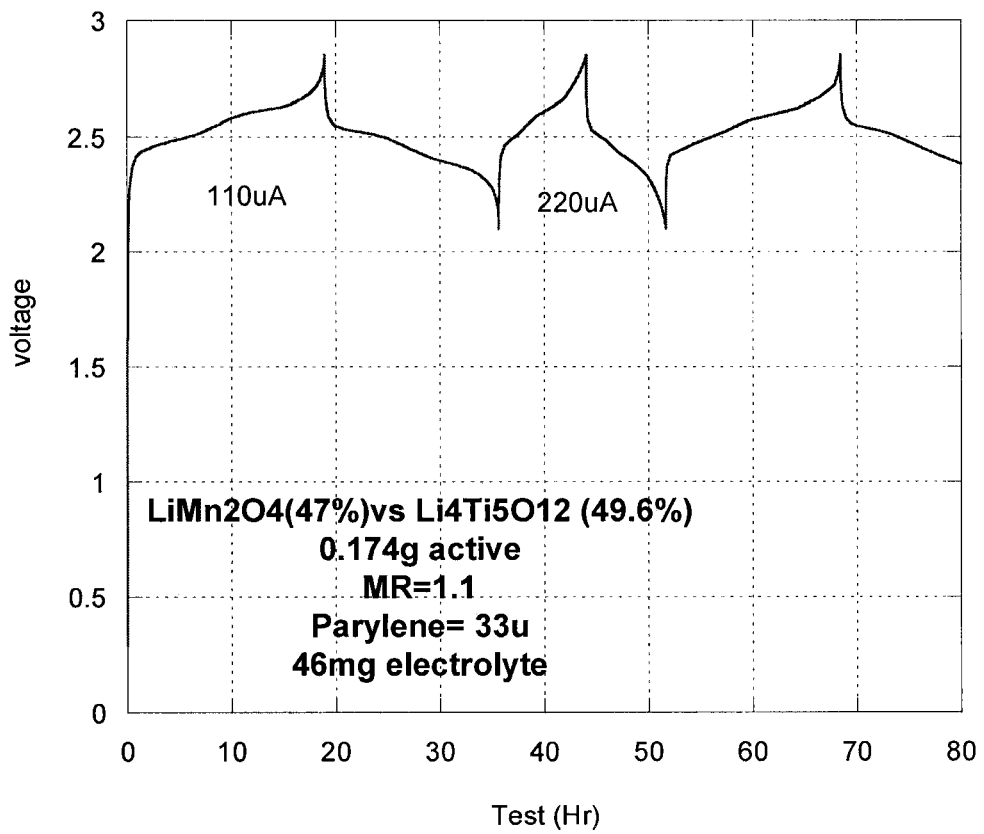
FIG. 4 shows a voltage profile of a lithium ion battery with a $LiMn_2O_4$ positive electrode and $Li_4Ti_5O_{12}$ negative electrode upon the application of 0.1 mA current.

The cell was examined for electrochemical activity. As can be seen in FIG. 4, the voltage profile upon the application of 0.1 mA current demonstrates the utilization of the cell to store charge and maintain reversibility while cycled in ambient atmosphere. Capacity utilization of the electrode was greater than 90%. This shows the effectiveness of the conformal packaging, since such a cell would not operate to this capacity without such barrier.

Example 5

Fabrication of Lithium Ion Battery with $LiMn_2O_4$ Positive Electrode and $TiS_2$ Negative Electrode A lithium ion battery cell stack was prepared in a similar fashion to that of example 4 except that here, the negative electrode was $TiS_2$ (instead of $Li_4Ti_5O_{12}$ in Example 4) with 0.049 g of $LiMn_2O_4$ positive electrode. A positive to negative electrode weight ratio of 0.91 was utilized. The cell was imbibed with 12 mg of 1M lithium bis-(trifluoromethanesulfonyl)-imide in 65% 1-butyl-3-methylimidazolium-, bis-(trifluoro-methanesulfonyl)-imide 35% tetramethylene sulfone. 20 microns of parylene C was deposited on the activated cell stack.

Figure 5:
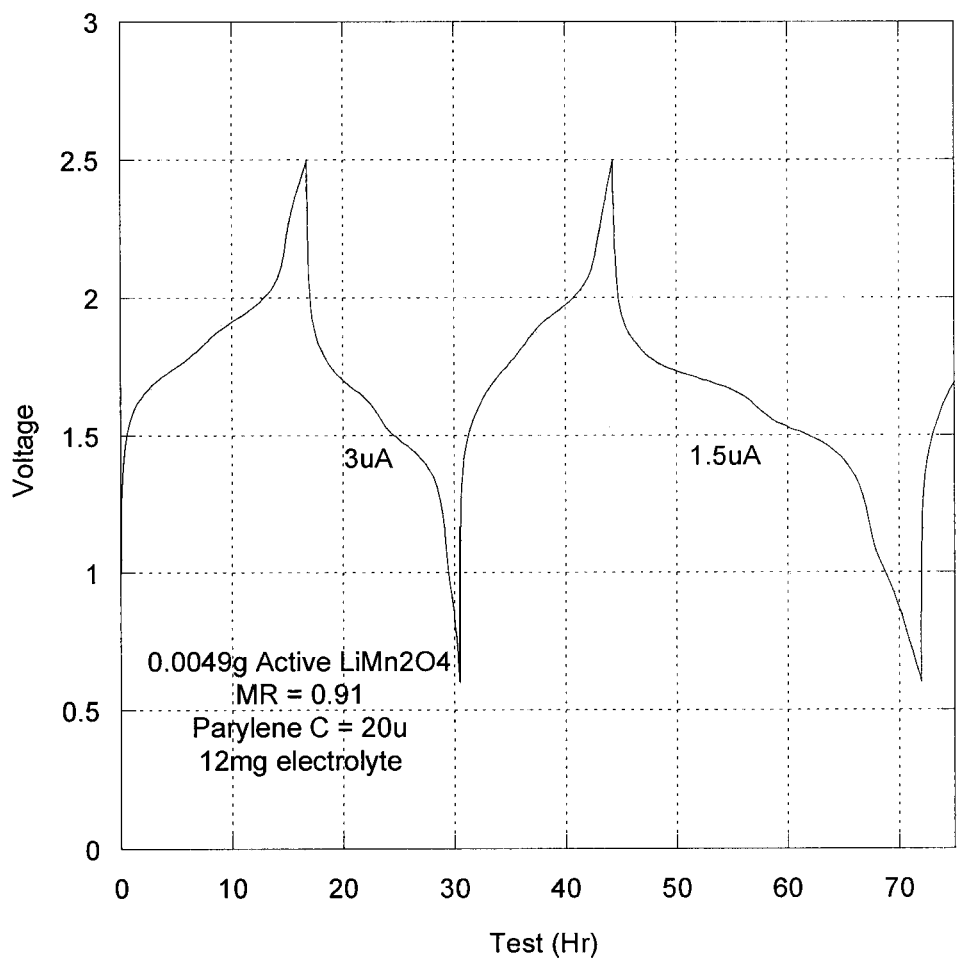
FIG. 5 shows a voltage profile of a lithium ion battery with a $LiMn_2O_4$ positive electrode and $TiS_2$ negative electrode upon the application of 0.003 mA current.

The cell was examined for electrochemical activity. As can be seen in FIG. 5, the voltage profile upon the application of 0.003 mA current demonstrates the utilization of the cell to store charge and maintain reversibility while cycled in ambient atmosphere. Capacity utilization of the electrode was greater than 90%, showing the effectiveness of the conformal packaging, since such a cell would not operate to this capacity without such barrier.

Example 6

Fabrication of Lithium Ion Battery with Electrolyte Lithium Bis-(trifluoromethanesulfonyl)-imide in 65% ethyl-methyl-imidazolium-, bis-(trifluoro-methanesulfonyl)-imide 35% tetramethylene Sulfone A lithium ion battery cell stack was fabricated in a similar fashion to example 5, except that the electrolyte was lithium bis-(trifluoromethanesulfonyl)-imide in 65% ethyl-methyl-imidazolium-, bis-(trifluoro-methanesulfonyl)-imide 35% tetramethylene sulfone.

Figure 6:
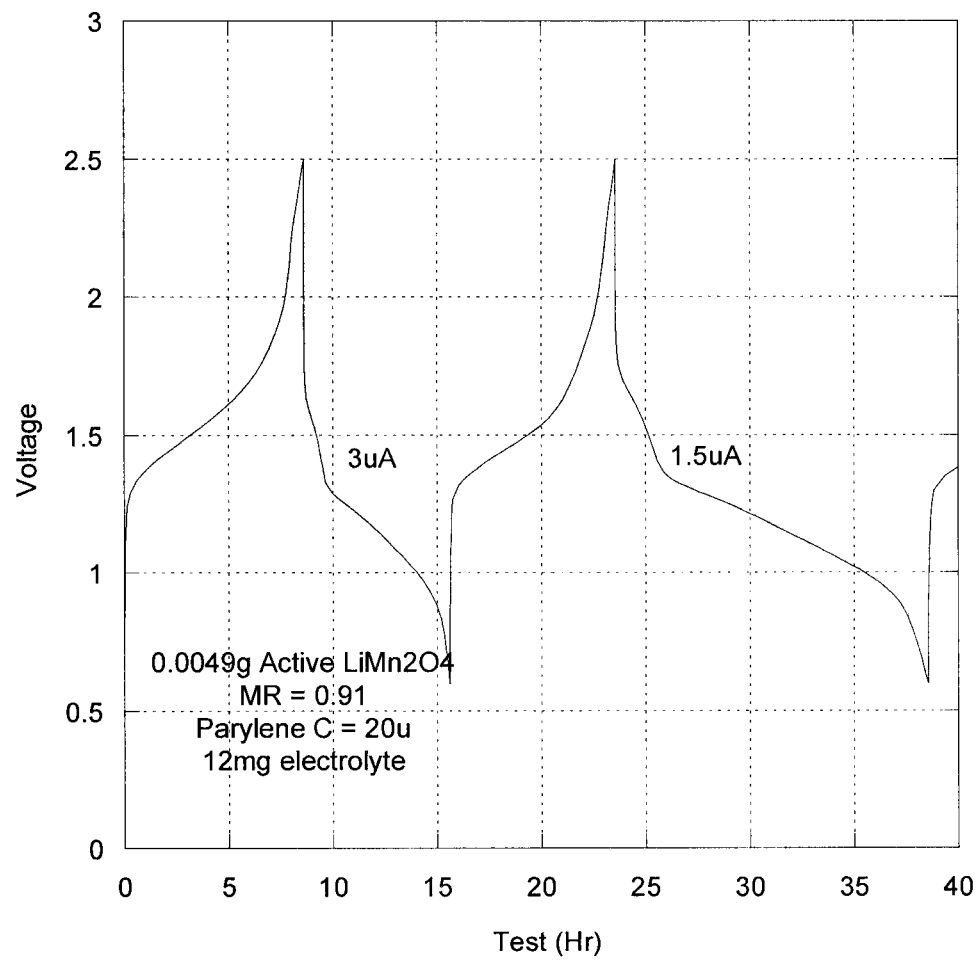
FIG. 6 shows a voltage profile of a lithium ion battery with electrolyte lithium bis-(trifluoromethanesulfonyl)-imide in 65% ethyl-methyl-imidazolium-, bis-(trifluoro-methanesulfonyl)-imide 35% tetramethylene sulfone upon the application of 0.003 mA current.

The cell was examined for electrochemical activity. As can be seen in FIG. 6, the voltage profile upon the application of 0.003 mA current demonstrates the utilization of the cell to store charge and maintain reversibility while cycled in ambient atmosphere, showing the effectiveness of the conformal packaging, since such a cell would not operate to this capacity without such barrier.

EQUIVALENTS

While the described invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the described invention. All such modifications are intended to be within the scope of the claims appended hereto.

What is claimed:

1. An electrochemical device comprising an electrochemical cell, wherein the electrochemical cell further comprises
   (i) an electrolyte comprising an ionic liquid;
   (ii) at least one electrochemical cell stack, comprising:
   (1) a first layer containing a porous positive electrode;
   (2) a second layer containing a porous separator;
   (3) a third layer containing a porous negative electrode, wherein the respective pores of the first, second, and third layers are interconnected; and
   (iii) a barrier packaging material comprising at least one conformal barrier coating layer deposited at a pressure of less than 100 mTorr, each layer of the at least one conformal barrier coating layer including at least one para-xylylene polymer variant.

2. The electrochemical device according to claim 1, wherein the second layer containing the porous separator is bonded between the first layer containing the porous positive electrode and the third layer containing the porous negative electrode.

3. The electrochemical device according to claim 1, wherein the barrier packaging material is conformally deposited over each surface of each side of the electrochemical cell stack.

4. The electrochemical device according to claim 1, wherein the ionic liquid further comprises a dissolved salt.

5. The electrochemical device according to claim 1, wherein the electrolyte further comprises a cosolvent that has a vapor pressure of less than 100 mTorr at the temperature at which the at least one conformal barrier coating layer is deposited.

6. The electrochemical device according to claim 1, wherein the at least one electrochemical cell stack further comprises a positive current collector associated with the positive electrode.

7. The electrochemical device according to claim 1, wherein the at least one electrochemical cell stack further comprises a negative current collector associated with the negative electrode.

8. The electrochemical device according to claim 4, wherein the dissolved salt is a dissolved salt of lithium ion ($Li^+$).

9. The electrochemical device according to claim 4, wherein the dissolved salt is a dissolved salt of at least one of magnesium ion ($Mg^{2+}$), zinc ion ($Zn^{2+}$), or lithium ion ($Li^+$).

10. The electrochemical device according to claim 1, wherein the ionic liquid further contains a piperidinium cation.

11. The electrochemical device according to claim 1, wherein the ionic liquid further contains a pyrrolidinium cation, or an imidazolium cation.

12. The electrochemical device according to claim 1, wherein the at least one electrochemical cell stack is a bonded microporous electrochemical cell stack that has the the ionic liquid stored within its pores.

13. The electrochemical device according to claim 1, wherein the electrochemical cell is a battery cell.

14. The electrochemical device according to claim 13, wherein the battery cell is a lithium ion battery cell.

15. The electrochemical device according to claim 1, wherein the respective electrode compositions of the porous positive electrode and the porous negative electrode are within the electrochemical stability of water.

16. The electrochemical device according to claim 13, wherein the battery cell is a fluoride battery cell.

17. The electrochemical device according to claim 1, wherein the electrochemical cell is a thermogalvanic cell.

18. The electrochemical device according to claim 1, wherein the electrochemical cell is an electrochemical capacitor cell.

19. The electrochemical device according to claim 18, wherein the electrochemical capacitor cell is a supercapacitor cell.

20. The device according to claim 18, wherein the electrochemical capacitor cell is a pseudocapacitor cell.

21. The electrochemical device according to claim 18, wherein the electrochemical capacitor cell is an asymmetric hybrid capacitor cell.

22. The electrochemical device according to claim 1, wherein each conformal barrier coating layer is deposited onto the electrochemical battery at a pressure less than 100 mTorr.

23. The electrochemical device according to claim 1, wherein the at least one para-xylylene polymer variant is a para-chloroxylylene polymer.

24. The electrochemical device according to claim 22, wherein each conformal barrier coating layer contains a barrier agent.

25. The electrochemical device according to claim 24, wherein the barrier agent is a hermetic agent.

26. The electrochemical device according to claim 1, wherein the barrier packaging material comprises alternating layers of the at least one conformal barrier coating layer containing at least one para-xylylene polymer variant and a conformal barrier coating layer comprising a barrier agent.

27. The electrochemical device according to claim 25, wherein the hermetic agent is a metal or metal oxide.

28. The electrochemical device according to claim 27, wherein the metal is selected from the group consisting of aluminium, copper, bismuth, or a combination thereof.

29. The electrochemical device according to claim 24, wherein the barrier agent is a carbon barrier agent.

30. The electrochemical device according to claim 29, wherein the carbon barrier agent is graphene.

31. The electrochemical device according to claim 24, wherein the barrier agent is an inorganic barrier agent.

32. The electrochemical device according to claim 31, wherein the inorganic barrier agent is a metal oxide.

33. The electrochemical device according to claim 1, wherein the conformal barrier coating layer ranges from 1 micron to 100 microns in thickness.

34. The electrochemical device according to claim 1, wherein the conformal barrier coating layer ranges from 5 microns to 25 microns in thickness.

35. The electrochemical device according to claim 1, wherein each electrode is associated with a current collector.

36. The electrochemical device according to claim 35, wherein the current collector is a metal current collector.

37. The electrochemical device according to claim 35, wherein the current collector is a carbon current collector.

38. The electrochemical device according to claim 37, wherein the carbon current collector comprises graphene.

39. The electrochemical device according to claim 37, wherein the carbon current collector comprises carbon nanotubes.

40. The electrochemical device according to claim 1, wherein each electrochemical cell stack comprises a plurality of electrochemical cells connected in parallel within the packaged electrochemical device.

41. The electrochemical device according to claim 1, wherein each electrochemical cell stack comprises a plurality of electrochemical cells connected in series within the packaged electrochemical device.

42. The electrochemical device according to claim 1, wherein the pressure is less than 10 mTorr.

43. The electrochemical device according to claim 5, wherein the vapor pressure is less than 10 mTorr.

44. The electrochemical device of claim 1, wherein one or both of the positive electrode and the negative electrode is porous and at least some of the pores of the separator and at least some of the pores of the one or both of the positive electrode and the negative electrode have some of the ionic liquid therein.

45. An electrochemical device comprising an electrochemical cell, wherein the electrochemical cell further comprises:
 at least one electrochemical stack having a first layer containing a positive electrode, a second layer containing a porous separator, and a third layer containing a negative electrode;
 an electrolyte comprising an ionic liquid; and
 a barrier packaging material comprising at least one conformal barrier coating layer, each layer of the at least one conformal barrier coating layer including at least one para-xylylene polymer variant, wherein one or both of the positive electrode and the negative electrode is porous and at least some of the pores of the separator and at least some of the pores of the one or both of the positive electrode and the negative electrode have some of the ionic liquid therein.

46. The electrochemical device of claim 45, wherein the at least one para-xylylene polymer variant is in direct contact with the ionic liquid.

* * * * *